(12) United States Patent
Gast et al.

(10) Patent No.: US 9,762,679 B2
(45) Date of Patent: Sep. 12, 2017

(54) PROVIDING STATELESS NETWORK SERVICES

(71) Applicant: Aerohive Networks, Inc., Milpitas, CA (US)

(72) Inventors: Matthew Stuart Gast, San Francisco, CA (US); Liang Wang, San Jose, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 470 days.

(21) Appl. No.: 14/216,742

(22) Filed: Mar. 17, 2014

(65) Prior Publication Data

US 2014/0280461 A1    Sep. 18, 2014

Related U.S. Application Data

(60) Provisional application No. 61/801,204, filed on Mar. 15, 2013.

(51) Int. Cl.
H04L 29/08 (2006.01)
(52) U.S. Cl.
CPC .......... H04L 67/16 (2013.01); H04L 67/025 (2013.01); H04L 67/327 (2013.01); H04L 67/34 (2013.01)
(58) Field of Classification Search
CPC ......... H04L 29/08; H04L 67/16; H04L 67/34; H04L 67/025; H04L 67/327
See application file for complete search history.

(56) References Cited

U.S. PATENT DOCUMENTS

| 5,845,091 A | * | 12/1998 | Dunne | ............... H04L 45/22 370/400 |
| 6,006,018 A | * | 12/1999 | Burnett | ............. G06F 21/6236 709/200 |
| 6,243,581 B1 | | 6/2001 | Jawanda | |
| 6,243,758 B1 | | 6/2001 | Okanoue | |
| 6,751,677 B1 | | 6/2004 | Ilnicki et al. | |
| 6,847,609 B1 | * | 1/2005 | Sarnikowski | ....... H04L 41/0803 370/229 |
| 6,976,087 B1 | * | 12/2005 | Westfall | ............. H04L 12/5695 370/238 |
| 7,032,022 B1 | | 4/2006 | Shanumgam et al. | |

(Continued)

FOREIGN PATENT DOCUMENTS

CN         102055769         5/2011

OTHER PUBLICATIONS

Seggelmann, R. et al., "Transport Layer Security (TLS) and Datagram Transport Layer Security (DTLS) Heartbeat Extension," Request for Comments (RFC) 6520, ISSN 2070-1721, Feb. 2012.

(Continued)

Primary Examiner — Larry Donaghue
(74) Attorney, Agent, or Firm — Sheppard, Mullin, Richter & Hampton LLP

(57) ABSTRACT

In various systems and methods, there can be received a request for a network service. A query for the network service can be formulated based on the request. A remote access device can be instructed to interrogate remote devices coupled to the remote network access device for the network service. Access parameters related to the network service can be received in response to the interrogation. The user device can be configured to access the network service based on the access parameters.

18 Claims, 17 Drawing Sheets

(56) References Cited

U.S. PATENT DOCUMENTS

| | | | |
|---|---|---|---|
| 7,506,054 B1* | 3/2009 | Fuh | H04L 63/0227 709/225 |
| 7,774,828 B2* | 8/2010 | Benenati | H04L 63/0815 726/5 |
| 7,974,234 B2 | 7/2011 | Gustave et al. | |
| 8,064,583 B1* | 11/2011 | Sutaria | G06Q 30/06 379/201.02 |
| 8,151,323 B2* | 4/2012 | Harris | H04L 63/0272 726/13 |
| 8,428,601 B2 | 4/2013 | Samar et al. | |
| 8,745,716 B2 | 6/2014 | Brudnicki et al. | |
| 2001/0044309 A1 | 11/2001 | Bar et al. | |
| 2002/0069117 A1* | 6/2002 | Carothers | G06Q 10/0631 705/7.12 |
| 2002/0099666 A1* | 7/2002 | Dryer | G06F 21/55 705/71 |
| 2002/0116463 A1 | 8/2002 | Hart | |
| 2002/0138632 A1* | 9/2002 | Bade | H04L 63/102 709/229 |
| 2003/0055818 A1* | 3/2003 | Faybishenko | G06F 17/30867 |
| 2003/0061388 A1* | 3/2003 | Cleghorn | G06F 17/30893 709/246 |
| 2003/0220116 A1 | 11/2003 | Sagefalk et al. | |
| 2004/0093340 A1 | 5/2004 | Edmondson et al. | |
| 2004/0100983 A1* | 5/2004 | Suzuki | H04L 12/185 370/432 |
| 2004/0166874 A1* | 8/2004 | Asokan | H04L 29/06 455/456.1 |
| 2004/0196858 A1* | 10/2004 | Tsai | H04L 45/00 370/401 |
| 2005/0010692 A1* | 1/2005 | Jain | H04W 12/06 709/249 |
| 2005/0022006 A1 | 1/2005 | Bass et al. | |
| 2005/0066200 A1* | 3/2005 | Bahl | G06Q 30/02 726/4 |
| 2005/0138204 A1* | 6/2005 | Iyer | H04L 12/4641 709/242 |
| 2005/0141465 A1* | 6/2005 | Kato | H04W 40/00 370/337 |
| 2006/0037071 A1* | 2/2006 | Rao | H04L 12/2856 726/13 |
| 2007/0208744 A1* | 9/2007 | Krishnaprasad | G06F 21/6227 |
| 2008/0034401 A1* | 2/2008 | Wang | H04L 63/20 726/1 |
| 2008/0186896 A1 | 8/2008 | Fanfelle et al. | |
| 2008/0307523 A1* | 12/2008 | Subramanyam | G06F 17/30731 726/21 |
| 2008/0316104 A1 | 12/2008 | Seong et al. | |
| 2009/0058653 A1 | 3/2009 | Geissler et al. | |
| 2009/0172789 A1* | 7/2009 | Band | G06F 21/604 726/5 |
| 2010/0024008 A1* | 1/2010 | Hopen | G06F 21/6218 726/4 |
| 2010/0074418 A1* | 3/2010 | Poremba | H04M 3/5237 379/37 |
| 2010/0250735 A1* | 9/2010 | Andersen | G06Q 10/10 709/224 |
| 2010/0277309 A1 | 11/2010 | Anderson et al. | |
| 2011/0093434 A1* | 4/2011 | Arora | G06F 17/30011 707/622 |
| 2011/0093919 A1* | 4/2011 | Naslund | H04L 63/20 726/3 |
| 2011/0283104 A1* | 11/2011 | Sangubhatla | H04L 63/0823 713/168 |
| 2012/0198064 A1 | 8/2012 | Boutros et al. | |
| 2012/0226814 A1* | 9/2012 | Stucker | H04L 63/0407 709/227 |
| 2012/0264402 A1 | 10/2012 | Zhang et al. | |
| 2013/0007239 A1* | 1/2013 | Agarwal | H04L 63/02 709/223 |
| 2013/0136123 A1 | 5/2013 | Ge et al. | |
| 2013/0185446 A1* | 7/2013 | Zeng | H04L 12/4633 709/228 |
| 2013/0225199 A1 | 8/2013 | Shaw | |
| 2014/0095525 A1* | 4/2014 | Hsiao | G06F 17/30442 707/759 |
| 2014/0127992 A1 | 5/2014 | Kuscher et al. | |
| 2015/0341765 A1 | 11/2015 | Macias et al. | |
| 2016/0014025 A1* | 1/2016 | Wang | H04L 45/00 370/392 |
| 2016/0183037 A1 | 6/2016 | Grohman | |

OTHER PUBLICATIONS

Winter, S. et al., "Transport Layer Security (TLS) Encryption for RADIUS," Request for Comments (RFC) 6614, ISSN 2070-1721, May 2012.

International Application No. PCT/US2013/057692, International Search Report and Written Opinion mailed May 1, 2014.

Long, M. et al., "Localised Authentication for Inter-Network Roaming Across Wireless LANs," IEE Proceedings—Communications, vol. 151, No. 5, pp. 496-500, Oct. 24, 2004.

Bolla, R. et al., "A Distributed Routing and Access Control Scheme for ATM Networks," IEEE International Conference on Communications, vol. 1, pp. 44-50, May 1994.

European Patent Application No. 13832735.8, Search Report mailed Aug. 1, 2016.

European Patent Application No. C15926EP2, Search Report dated Mar. 7, 2017.

Deng, Yueming et al., "Trust-Based Fast Inter-Domain Secure Handoff over Heterogeneous Wireless Networks," 7th International Conference on Wireless Communications, Networking and Mobile Computing (WiCOM), pp. 1-5, Oct. 2011.

* cited by examiner

PROVIDING STATELESS NETWORK SERVICES

CROSS-REFERENCE TO RELATED APPLICATIONS

The present application claims priority to U.S. Provisional Application Ser. No. 61/801,204, filed Mar. 15, 2013, and entitled, "Stateless Network Gateway," which is incorporated by reference.

BACKGROUND

Entities, from large organizations to individuals, have implemented computer networks at varying sizes and levels of security. Typically, computer networks have allowed entities to connect digital devices and to allow digital devices to share images, files, video, streaming content, and other data. with one another.

Many computer networks have transitioned from using platform-specific protocols toward using general network-addressing protocols, such as Transmission Control Protocol/Internet Protocol (TCP/IP). Under general network-addressing protocols, devices are assigned unique network addresses used to identify their locations on the network. The location can in turn be used to identify the device as a source or destination of network traffic, and can be appended to a portion of traffic to and from the device. In various systems, the unique network address of a device is typically either statically or dynamically assigned to the device.

In many situations, user devices are used to access remote network services that are not locally accessible, but rather, are accessible through a network connection. It would be desirable to manage such access and related communications without overutilizing hardware and/or other attributes of network access devices.

SUMMARY

In some implementations, there is provided systems and methods to provide access to remote network services without maintaining the state of the network resources at all access points in the network. A request for a network service can be received. A query for the network service can be formulated based on the request. A remote access device can be instructed to interrogate remote devices coupled to the remote network access device for the network service. Access parameters related to the network service can be received in response to the interrogation. The user device can be configured to access the network service based on the access parameters.

In some implementations, instructing the remote network access device to interrogate the remote devices occurs after formulating the query for the network service. The user device can be configured to access the network service based on the access parameters without locally maintaining a state of the network services. In some implementations, transfer of the network service is initiated to the user device. The can comprise one or more of: a print service, a file service, a sharing service, a peripheral or device-related service, a display control service, and a service that supports a particular communication protocol. The request can be tagged with a network location of the user device. The user device can reside on a first Virtual Local Area Network (VLAN), and the network service and the remote network access device can reside on a second VLAN. The user device can reside in a first building, and the network service and the remote network access device can reside in a second building.

DETAILED DESCRIPTION

Figure 1:
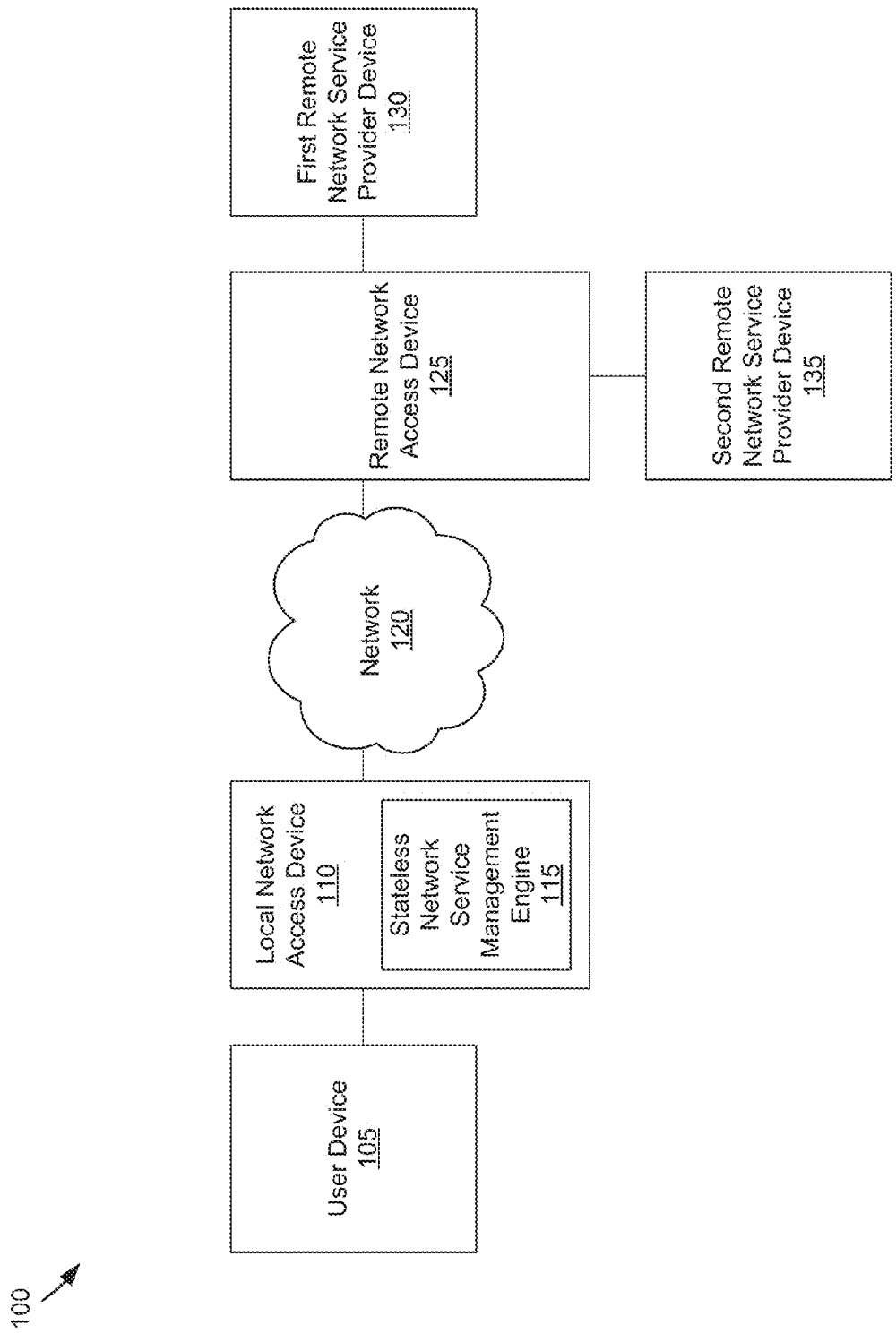
FIG. 1 shows an example of a stateless network service environment.

FIG. 1 shows an example of a stateless network service environment 100. In the example of FIG. 1, the stateless network service environment 100 includes a user device 105, a local network access device 110, a network 120, a remote network access device 125, a first remote network service provider device 130, and a second remote network service provider device 135. In the stateless network service environment 100, the user device 105 can obtain access to network services associated with the first remote network service provider device 130 and/or the second remote network service provider device 135 without either the local network access device 110 or the remote network access device 125 storing a state of the devices network service. As discussed herein, particularly where the stateless network service environment 100 includes many devices and/or many Virtual Local Area Networks (VLANs), providing stateless network services can limit the memory required of network access devices, such as the local network access device 110.

In the example of FIG. 1, the user device 105 is coupled to the local network access device 110. In various implementations, the user device 105 can include an engine and/or a datastore. An "engine," as used herein, can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. The term engine can refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term engine can include memory (shared, dedicated, or group) that stores code executed by the processor. The term code, as used above, can include software, firmware, and/or microcode, and can refer to programs, routines, functions, classes, and/or objects. The term shared, as used above, means that some or all code from multiple engines can be executed using a single (shared) processor. In addition, some or all code from multiple engines can be stored by a single (shared) memory. The term group, as used above, means that some or all code from a single engine can be executed using a group of processors or a group of execution engines. For example, multiple cores and/or multiple threads of a processor can be considered to be execution engines. In various implementations, execution engines can be grouped across a processor, across multiple processors, and across processors in multiple locations, such as multiple servers in a parallel processing arrangement.

A "datastore," as used herein, can be implemented, for example, as software embodied in a physical computer-readable medium on a general- or specific-purpose machine, in firmware, in hardware, in a combination thereof, or in an applicable known or convenient device or system. Datastores described in this paper are intended, if applicable, to include any organization of data, including tables, comma-separated values (CSV) files, traditional databases (e.g., SQL), or other known or convenient organizational formats.

In an example of a system where the datastore is implemented as a database, a database management system (DBMS) can be used to manage the datastore. In such a case, the DBMS can be thought of as part of the datastore or as part of the user device 105, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which can include a hierarchical model, network model, relational model, object model, or some other applicable known or convenient organization. An optimal structure can vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In a specific implementation, the user device 105 can include a digital device and/or a computer system, as discussed in this paper. In some implementations, the user device 105 can have some or all of the elements of the digital device 1600, shown in FIG. 16. Examples of digital devices include personal computers, networked servers, networked printers and/or peripherals, mobile phones, tablet computing devices, personal data assistants (PDAs), The user device 105 can include a memory and a processor. The user device 105 can be configured similarly to a digital device 1600, shown in FIG. 16. The user device 105 can include an operating system (OS) and/or one or more applications. The OS can include hardware and/or software to manage the hardware of the user device 105 and provide services for applications on the user device 105. Examples of OSs running on the user device 105 can include Android OSs, BSD, iOS, Linux, Mac OS X, Microsoft Windows, Windows Phone, and z/OS. The OS and/or applications on the user device 105 can manage access to the network 120. The applications on the user device 105 can include application software which helps the user device 105 perform tasks beyond the operation of the user device 105.

The OS and/or the applications on the user device 105 can provide network access for the user device 105. For instance, the OS and/or applications on the user device 105 can allow the user device 105 to access information not stored on the user device 105. The network access can include access to the network 120. The network access can be managed by OS routines, by applications involving interactions with a user (e.g., web browsers, email clients, shared directories accessible over the network 120), or other components of the user device 105. In some embodiments, aspects of the network access can be managed by a user of the user device 105. Some aspects of the network access of the user device 105 can also be managed by an Information Technology (IT) administrator who manages other portions of the network 120. The network address can be managed by security applications that execute on the user device 105.

The user device 105 can include a desktop computer, a laptop computer, a mobile phone, a mobile phone with data capabilities (e.g., a "Smartphone"), a tablet computing device, or other digital device. Examples of desktop and laptop computers include Macintosh® computers running some version of Mac OS X and Windows® computers manufactured by an Original Equipment Manufacturer (OEM). Examples of mobile phones and tablet computing devices include Android® devices, devices running a version of iOS®, Blackberries®, and other devices. The user device 105 can be a participant in a Bring Your Own Device (BYOD) scheme.

In the example of FIG. 1, the local network access device 110 is coupled to the user device 105 and to the network 120. In some implementations, the local network access device 110 can provide the user device 105 with access to resources of the network 120. The local network access device 110 can, in some implementations, provide network security for the user device 105 and/or other devices coupled to the network 120. In various implementations, the local network access device 110 can maintain trusted resources of the network 120. The local network access device 110 can be configured as an access point, a router, a switch, a firewall, or a gateway. In some implementations, the local network access device 110 can be implemented as one or more of the devices shown in FIG. 17.

In the example of FIG. 1, the local network access device 110 includes the stateless network service management engine 115. In a specific implementation, the local network access device 110 can allow the user device 105 to obtain access to network services associated with the first remote network service provider device 130 and/or the second remote network service provider device 135 without either the local network access device 110 or the remote network access device 125 storing a state of the network service.

More specifically, in various implementations, the stateless network service management engine 115 can receive from the user device 105 a request for remote network services (e.g., network services associated with the first remote network service provider device 130 and/or the second remote network service provider device 135). The stateless network service management engine 115 can further relay the request to the remote network access device 125. The stateless network service management engine 115 can instruct the remote network access device 125 to query network service devices (e.g., the first remote network service provider device 130 and/or the second remote network service provider device 135) for the requested network service. If the requested network service is supported, the stateless network service management engine 115 can receive the network service from the remote network access device 125. It is noted the stateless network service management engine 115 need not store a state of either the first remote network service provider device 130 or the second remote network service provider device 135 in these implementations. In some implementations, some or all of the stateless network service management engine 115 can correspond to some or all of the stateless network service management engine 200, shown in FIG. 2.

In the example of FIG. 1, the network 120 is coupled to the local network access device 110 and to the remote network access device 125. In a specific implementation, the network 120 includes a networked system including several computer systems coupled together, such as the Internet, or a device for coupling components of a single computer, such as a bus. The term "Internet" as used in this paper refers to a network of networks using certain protocols, such as the TCP/IP protocol, and possibly other protocols such as the hypertext transfer protocol (HTTP) for hypertext markup language (HTML) documents making up the World Wide Web (the web). Content is often provided by content servers, which are referred to as being "on" the Internet. A web server, which is one type of content server, is typically at least one computer system, which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 120 broadly includes, as understood from relevant context, anything from a minimalist coupling of the components illustrated in the example of FIG. 1, to every component of the Internet and networks coupled to the Internet. In some implementations, the network 120 is administered by a service provider, such as an Internet Service Provider (ISP).

In various implementations, the network 120 may include technologies such as Ethernet, 802.11, worldwide interoperability for microwave access (WiMAX), 3G, 4G, CDMA, GSM, LTE, digital subscriber line (DSL), etc. The network 120 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over network 120 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the network 120 includes a wired network using wires for at least some communications. In some implementations, the network 120 comprises a wireless network. A "wireless network," as used in this paper may include any computer network communicating at least in part without the use of electrical wires. In various implementations, the network 120 includes technologies such as Ethernet, 802.11, worldwide interoperability for microwave access (WiMAX), 3G, 4G, CDMA, GSM, LTE, digital subscriber line (DSL), etc. The network 120 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 120 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the wireless network of the network 120 is compatible with the 802.11 protocols specified by the Institute of Electrical and Electronics Engineers (IEEE). In a specific implementation, the wired network, if any, of the network 120 is compatible with the 802.3 protocols specified by the IEEE. In some implementations, IEEE 802.3 compatible protocols of the network 120 may include local area network technology with some wide area network applications. Physical connections are typically made between nodes and/or infrastructure devices (hubs, switches, routers) by various types of copper or fiber cable. The IEEE 802.3 compatible technology can support the IEEE 802.1 network architecture of the network 120.

In a specific implementation, the network 120 can include trusted resources administered by a security device such as a switch, a firewall, a router, or a gateway. As used herein "trusted resources" are secure resources that are available in areas administered by the security device but are unavailable outside the areas administered by the security device. It is noted that a device can be able to access the trusted resources without directly being coupled to the trusted network, e.g., by establishing a logical or virtual presence on the trusted resources. The trusted resources can include resources of a LAN, a WAN, or a MAN, or portions thereof. The trusted resources can include portions of the Internet. For instance, the trusted resources can include secure portions of Internet-accessible resources (e.g., cloud-based resources).

In some implementations, the trusted resources of the network 120 can have a geographical component. That is, the trusted resources can be limited to a specified geographical locale, such as a hospital, a community, a school, an organization, or a particular office building, for instance. The trusted resources, in various embodiments, can be managed by a common entity, such as an organization that has multiple locations. For instance, the trusted resources can comprise a common network maintained by multiple offices of a specific organization, such as a corporation. The resources can be limited to a class of devices seeking to access a trusted resource. For example, the resources can include a network of iPhones® (or other devices) trying to access a resource available only to iPhones®. As another example, the trusted resources can be limited to a class of devices having a common processing power and/or a common network capability. In various implementations, the network 120 can include untrusted resources. The untrusted resources can, in some implementations, include portions of the Internet. Access to the untrusted resources may or may not be administered by the security device that administers trusted resources of the network 120.

In the example of FIG. 1, the remote network access device 125 is coupled to the network 120 and to the first remote network service provider device 130. In some implementations, the remote network access device 125 can provide the first remote network service provider device 130 with access to the network 120. The remote network access device 125 can, in some implementations, provide network security for the first remote network service provider device 130 and/or other devices coupled to the network 120. In various implementations, the remote network access device 125 can maintain trusted resources of the network 120. The remote network access device 125 can be configured as an access point, a router, a switch, a firewall, a gateway, or a server. In some implementations, the remote network access device 125 can be implemented as one or more of the devices shown in FIG. 17.

In the example of FIG. 1, the first remote network service provider device 130 is coupled to the remote network access device 125. In various implementations, the first remote network service provider device 130 can include an engine and/or a datastore. In a specific implementation, the first remote network service provider device 130 can include a digital device and/or a computer system, as discussed in this paper. In various implementations, the first remote network service provider device 130 can act to provide one or more network services for the other devices coupled to the network 120. Network services can include any services that are provided over a network, including but not limited to: print services, file services, sharing services, Airplay® services, peripheral or device-related services, and display controls. In some implementations, the first remote network service provider device 130 can be configured as a networked television.

In the example of FIG. 1, the second remote network service provider device 135 is coupled to the remote network access device 125. In various implementations, the second remote network service provider device 135 can include an engine and/or a datastore. In a specific implementation, the second remote network service provider device 135 can include a digital device and/or a computer system, as discussed in this paper. In various implementations, the second remote network service provider device 135 can act to provide one or more network services for the other devices coupled to the network 120. In some implementations, the second remote network service provider device 135 can be configured as a networked printer.

Figure 2:
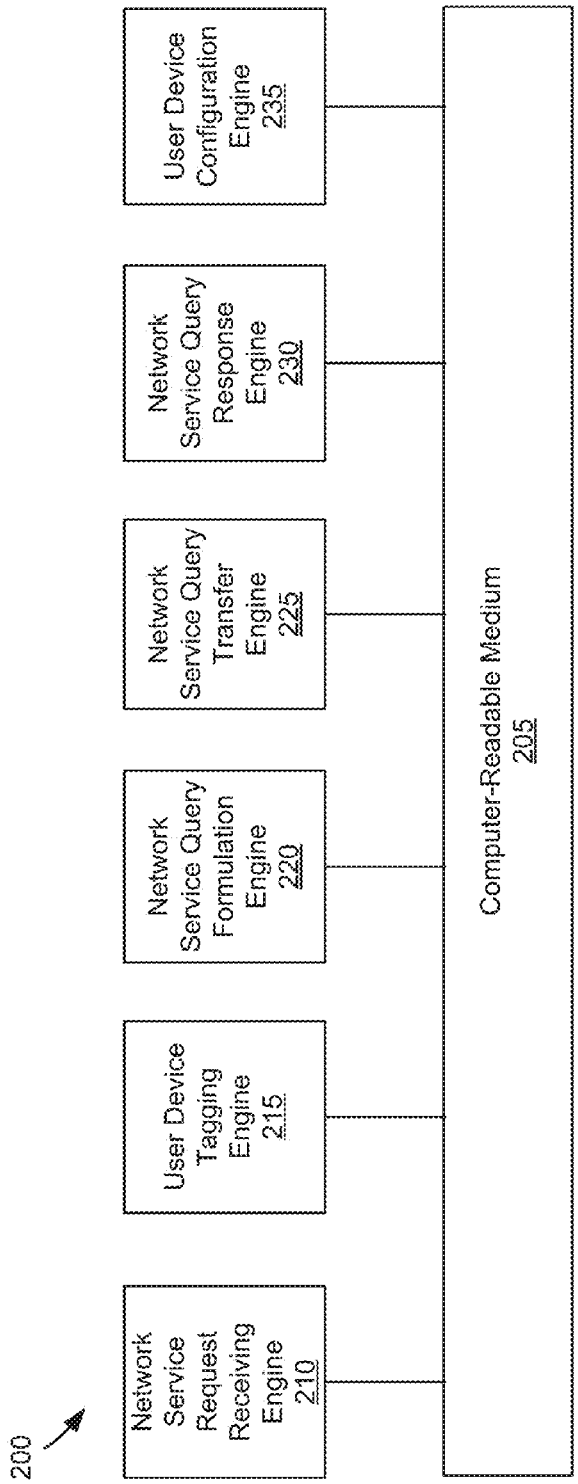
FIG. 2 shows an example of a stateless network service management engine.

FIG. 2 shows an example of a stateless network service management engine 200, according to some implementations. In the example of FIG. 2, the stateless network service management engine 200 includes a computer-readable medium 205, a network service request receiving engine 210, a user device tagging engine 215, a network service query formulation engine 220, a network service query transfer engine 225, a network service query response engine 230, and a user device configuration engine 235. In various implementations, one or more of the network service request receiving engine 210, the user device tagging engine 215, the network service query formulation engine 220, the network service query transfer engine 225, the network service query response engine 230, and the user device configuration engine 235 can include an "engine," as described herein.

In the example of FIG. 2, the computer-readable medium 205 is coupled to the network service request receiving engine 210, the user device tagging engine 215, the network service query formulation engine 220, the network service query transfer engine 225, the network service query response engine 230, and the user device configuration engine 235. The computer-readable medium 205 can include a "computer-readable medium," examples of which are given herein. The computer-readable medium 205 can also couple the components of the stateless network service management engine 200 to external devices, such as portions of the user device 105 and/or the network 120, both shown in FIG. 1.

In the example of FIG. 2, the network service request receiving engine 210 is coupled to the computer-readable medium 205. In an implementation, the network service request receiving engine 210 receives requests for network services. In some implementations, the network service request receiving engine 210 can receive requests from a user device (e.g., the user device 105 shown in FIG. 1). The requests may include requests for remote network services (e.g., services provided by one or more of the first remote network service provider device 130 and/or the second remote network service provider device 135, shown in FIG. 1). The requests may involve requests for a type of network. For example, the requests may include a request for a network print service, a streaming content service, an Airplay® service, or a service provided by a particular peripheral device or class of peripheral devices.

In the example of FIG. 2, the user device tagging engine 215 is coupled to the computer-readable medium 205. In an implementation, the user device tagging engine 215 can tag a request for a network service with the identifier of the user device making the request. In various implementations, the user device tagging engine 215 can tag the request with a level-2 address (e.g., a MAC address) or a level-3 address (e.g., an IP address) of the user device making the request. For instance, the user device tagging engine 215 can tag the request with a level-2 address (e.g., a MAC address) or a level-3 address (e.g., an IP address) of the user device 105, shown in FIG. 1. In an implementation, the user device tagging engine 215 inserts the identifier of the user device making the request into header portions of a data packet from the user device.

In the example of FIG. 2, the network service query formulation engine 220 is coupled to the computer-readable medium 205. In an implementation, the network service query formulation engine 220 formulates a query for a remote network access device to provide the requested network service if the requested network service is supported by a network service device coupled to the remote network access device. For example, in an implementation, the network service query formulation engine 220 can formulate a query for the remote network access device 125 to provide the requested network service if the requested network service is supported by one or more of the first remote network service provider device 130 and/or the second remote network service provider device 135. The query may include instructions to the remote network access device to provide the requested network service if the requested network service is supported. In various implementations, the query may be formulated after the request for the network service. Advantageously, various implementations do not require the stateless network service management engine 200 to maintain state tables of remote network service provider devices.

In the example of FIG. 2, the network service query transfer engine 225 is coupled to the computer-readable medium 205. In an implementation, the network service query transfer engine 225 can provide the query for the remote network service to other devices. In various implementations, the network service query transfer engine 225 can provide the query to a network, such as the network 120, shown in FIG. 1.

In the example of FIG. 2, the network service query response engine 230 is coupled to the computer-readable medium 205. In an implementation, the network service query response engine 230 can receive from the remote network access device a response to the query. The response can indicate whether the remote network access device is coupled to remote network service provider devices that support the requested network service. The response can further indicate the specific addresses of remote network service provider devices that support the requested network service. For instance, a response from the remote network access device 125 can include (a) whether the first remote network service provider device 130 and/or the second remote network service provider device 135 support the requested network service, and (b) if so, the specific network address of one or more of the first remote network service provider device 130 and/or the second remote network service provider device 135 that support the requested network service.

In the example of FIG. 2, the user device configuration engine 235 is coupled to the computer-readable medium 205. In an implementation, the user device configuration engine 235 can configure a user device to access requested network services. More particularly, the user device configuration engine 235 can configure ports, addresses, and other parameters of a device to adequately access requested network services. In an implementation, the user device configuration engine 235 can establish a connection between a user device and remote network service device(s) so that a specified network service can be provided. For instance, the user device configuration engine 235 can configure the user device 105 to access one or more of the first remote network service provider device 130 and/or the second remote network service provider device 135, shown in FIG. 1.

Figure 3:
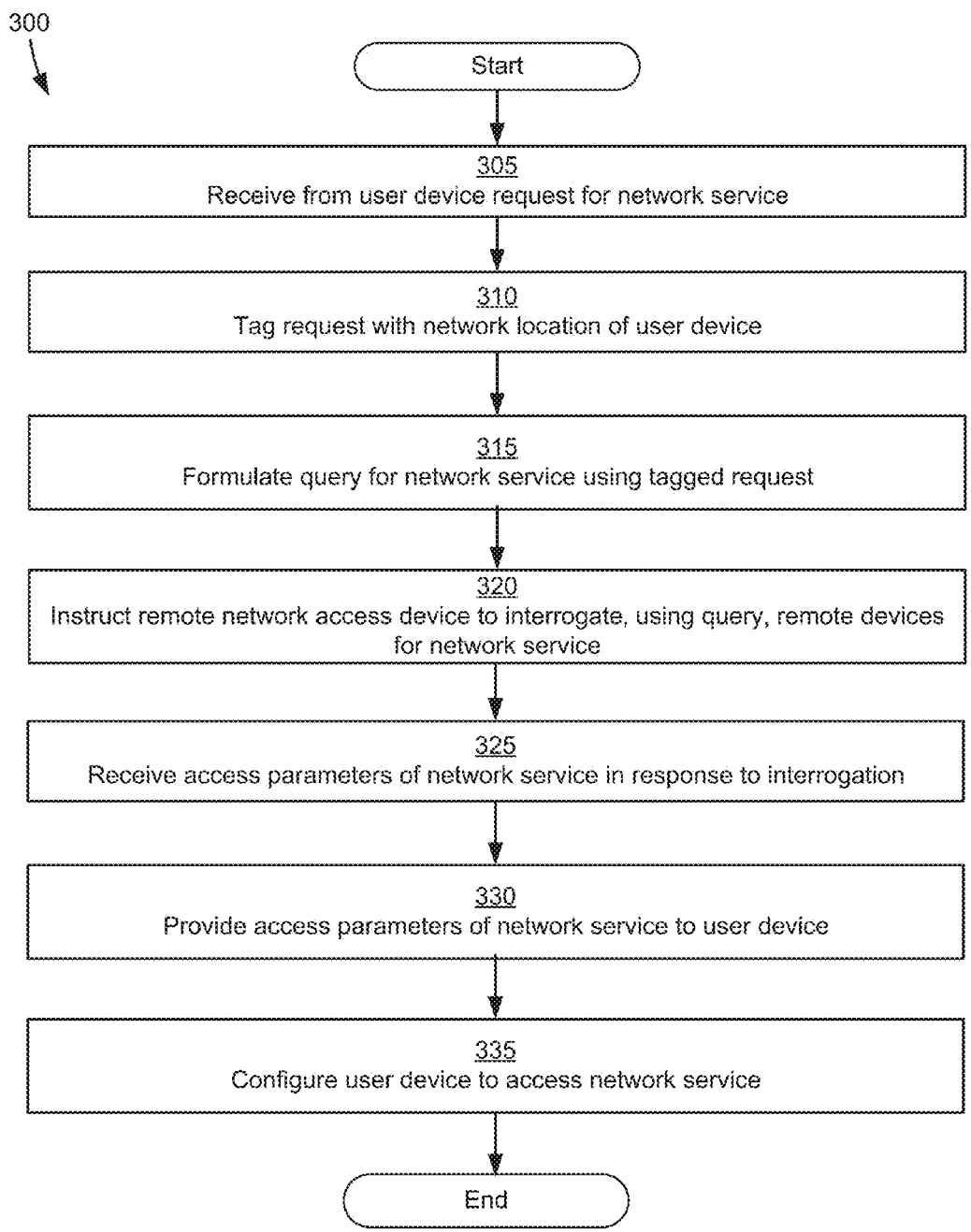
FIG. 3 shows a flowchart of an example of a method for providing stateless network services.

FIG. 3 shows a flowchart 300 of an example of a method for providing stateless network services. The flowchart 300 is discussed in conjunction with the stateless network service management engine 200, shown in FIG. 2. It is noted the flowchart 300 can include fewer or additional blocks without departing from the scope and substance of the inventive concepts herein.

At block 305, the network service request receiving engine 210 receives from a user device a request for a network service. More specifically, the network service request receiving engine 210 can receive a request from the user device 105 a request for one or more of the first remote network service provider device 130 and/or the second remote network service provider device 135. The request may comprise a request for network services from a particular device, or may comprise a request for network services that fall within a particular class of network services. In an implementation, the request comprises a request for all network services that support a particular communication protocol (such as all network services that support Airplay® services). The request may also comprise other types of requests for network services without departing from the scope and substance of the inventive concepts described herein.

At block 310, the user device tagging engine 215 tags the request with a network location of the user device. In various implementations, the user device tagging engine 215 can insert information about the user device 105 into the header of data packets to the network 120. The user device tagging engine 215 can further provide the tagged request to the network service query formulation engine 220.

At block 315, the network service query formulation engine 220 formulates a query for the network service using the tagged request. In an implementation, the query can include identifiers and/or specific protocols of the network service being requested and information about the user device that is making the request. The query can also include one or more levels of permissions the user device needs to have in order to have access to the network services. In some implementations, the query has a format that is compatible with a remote network access device (e.g., the remote network access device 125). More specifically, the query can be configured to provide instructions to the remote network access device to provide what devices are coupled thereto.

At block 320, the network service query transfer engine 225 instructs a remote network access device to interrogate, using the query, remote devices for the network service. In some implementations, the network service query transfer engine 225 can instruct the remote network access device 125 to interrogate all devices coupled thereto for the presence of the specified network service. Interrogation may include sending simple network commands to all devices coupled to the remote network access device 125. The simple commands may include instructing devices coupled thereto to: (a) return whether the devices provide the specified network service, and (b) if so, return relevant access parameters of the specified network service.

At block 325, the network service query response engine 230 receives access parameters of the network service in response to the interrogation. In various implementations, the access parameters can include: device and/or network address(es) of remote network service providers, usernames and/or passwords to access remote network services, and other things that would allow access to the network services. At block 330, the user device configuration engine 235 provides the location of the network service to the user device. At block 335, the user device configuration engine 235 configures the user device to access the network services. In some implementations, the user device configuration engine 235 can initiate transfer of the network service(s) to the user device 105.

Figure 4:
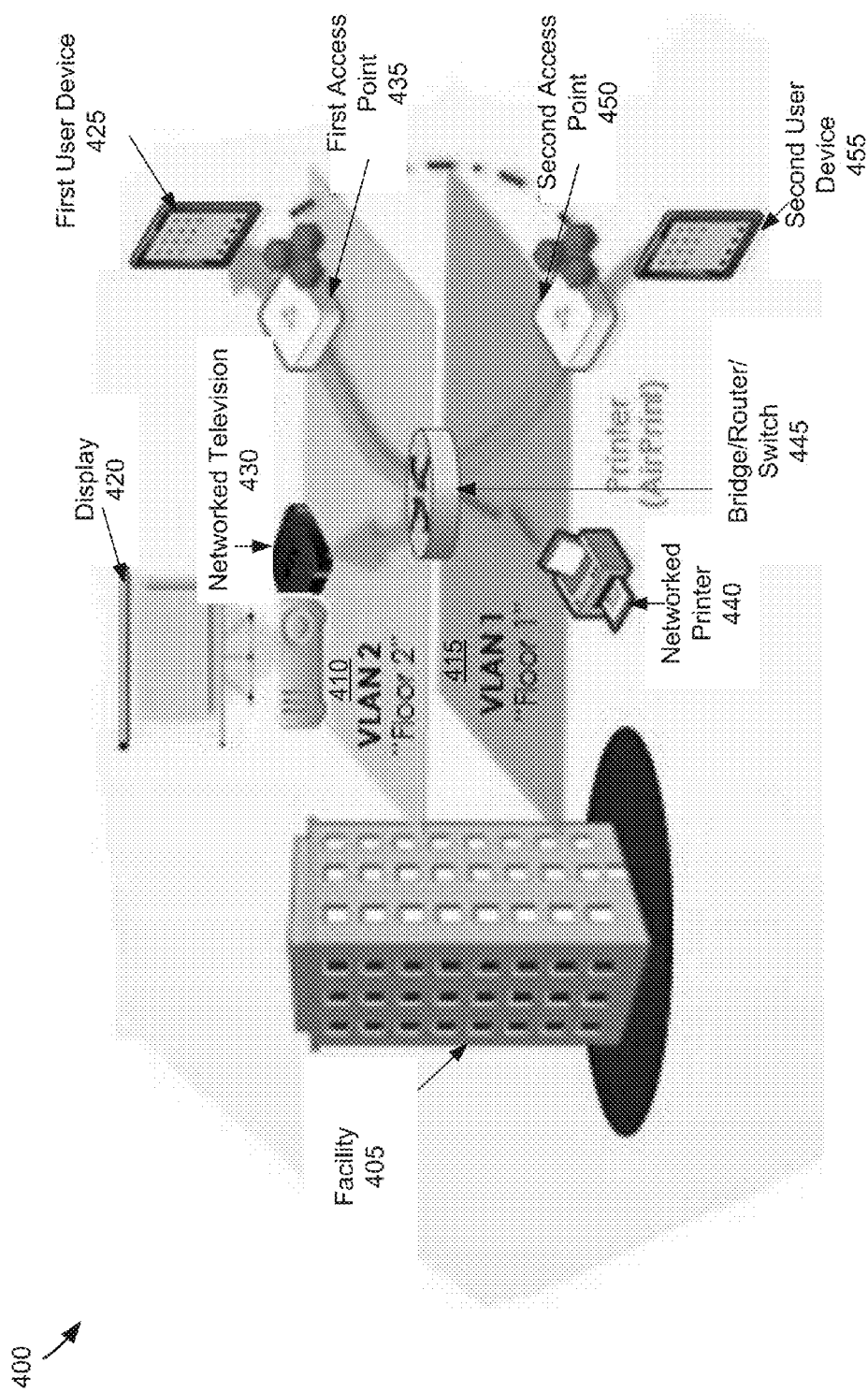
FIG. 4 shows an example of a stateless network service environment.

FIG. 4 shows an example of a stateless network service environment 400. In the example of FIG. 4, the stateless network service environment 400 includes a facility 405, a first VLAN 410, a second VLAN 415, a display 420, a first user device 425, a networked television 430, a first access point 435, a networked printer 440, a bridge/router/switch 445, a second access point 450, and a second user device 455. In an implementation, the first access point 435 can include a stateless network service management engine, such as the stateless network service management engine 115 shown in FIG. 1. The first access point 435 can provide the first user device 425 with access to remote network services (e.g., the networked printer 440 and/or the second user device 455) without the first access point 435 storing state tables related to the remote network services.

Figure 5:
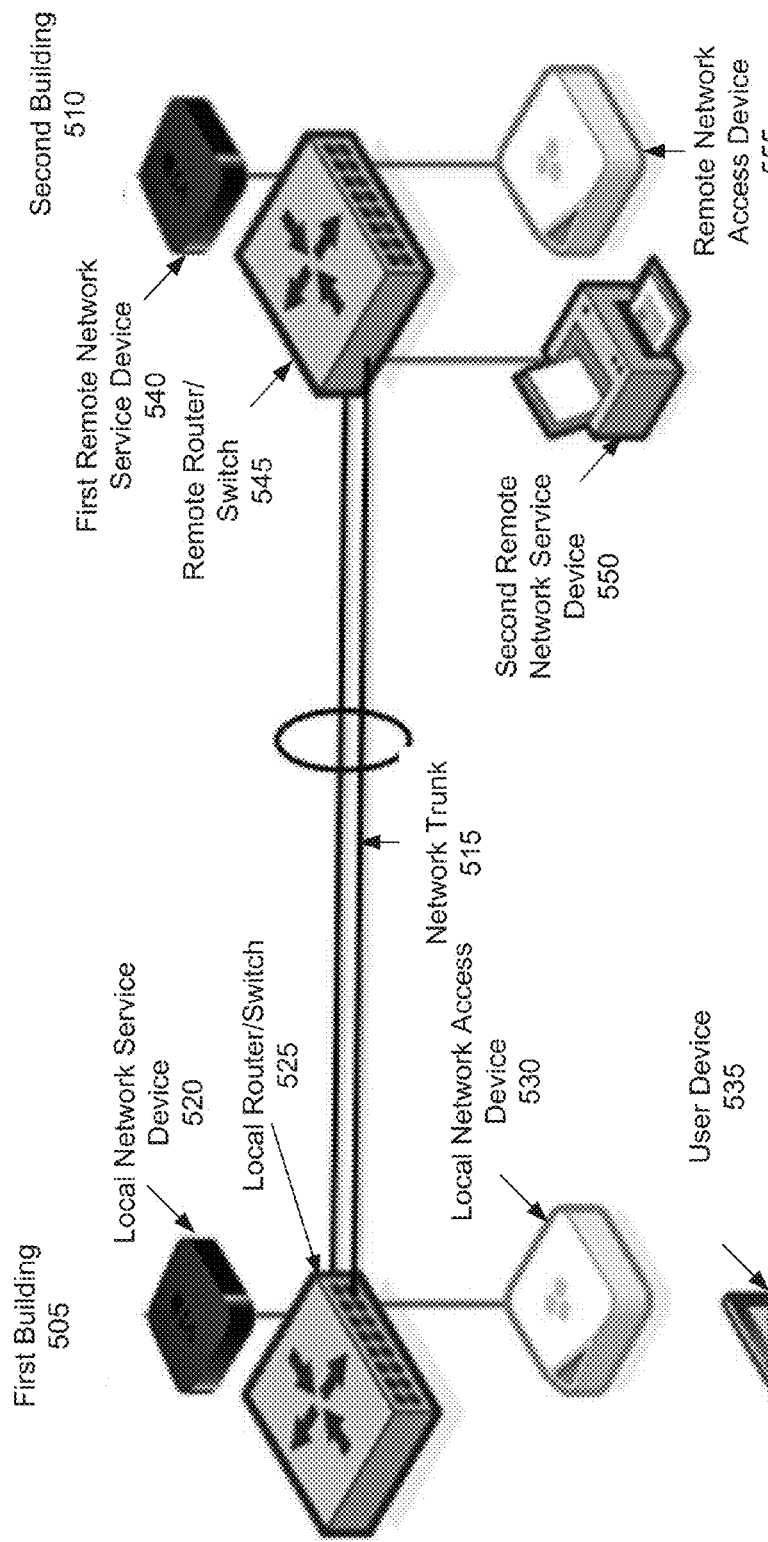
FIG. 5 shows an example of a network environment.

FIG. 5 shows an example of a network environment 500. In the example of FIG. 5, the network environment 500 includes a first building 505, a second building 510, and a network trunk 515. In the example of FIG. 5, the first building 505 is coupled to the network trunk 515. The first building 505 can include a local network service device 520, a local router/switch 525, a local network access device 530, and a user device 535. As discussed herein, one or more of the elements of the network environment 500 can correspond to one or more of the elements in the stateless network service environment 100, shown in FIG. 1.

In the example of FIG. 5, the local network service device 520 is coupled to the local network access device 530. In an implementation, the local network service device 520 can provide network services to other devices in the network environment 500. For instance, in various implementations, the local network service device 520 can include a networked television that receives content from the local network access device 530 and provides the content to other devices in the network environment 500. In some implementations, the local network service device 520 can be linked to an Internet television service, such as Google® television, Apple® television, or Roku®. The local network service device 520 can include hardware and/or software that implements protocols of the Internet television service.

In various implementations, the local network service device 520 receives requests for content from one or more of the other devices in the network environment 500. For instance, the local network service device 520 can receive requests for content from the user device 535. The local network service device 520 can also receive requests for content from devices in the second building 510. The local network service device 520 can satisfy the requests with content from the Internet using the local network access device 530 and/or the local router/switch 525, as discussed herein.

In the example of FIG. 5, the local router/switch 525 is coupled to the local network access device 530 and to the network trunk 515. In an implementation, the local router/switch 525 couples the local network access device 530 (and devices coupled thereto) to the network trunk 515. In various implementations, the local router/switch 525 can translate protocols used by the local network access device 530 to network protocols used to communicate over the network trunk 515. The local router/switch 525 can also provide security for the local network access device 530 and the devices coupled thereto. More specifically, the local router/switch 525 can protect the local network access device 530 and/or the user device 535 from rom malicious incoming traffic, and can prevent malicious outgoing traffic from passing to the network trunk 515. Though FIG. 5 shows the local router/switch 525 as separate from the local network access device 530, it is noted that in various implementations, the functionalities of the local router/switch 525 can be incorporated into the local network access device 530 or vice versa. Moreover, though portions of the discussion herein may refer to a stateless network service management engine (e.g., the stateless network service management engine 115 shown in FIG. 1) as residing within the local network access device 530, it is noted that in various implementations, the a stateless network service management engine can reside within the local router/switch 525.

In the example of FIG. 5, the local network access device 530 is coupled to the local network service device 520, to the local router/switch 525, and to the user device 535. In some implementations, the local network access device 530 can provide the local network service device 520 and the user device 535 with access to local devices and/or the network trunk 515. More specifically, the local network access device 530 can connect the local network service device 520 and the user device 535 to one or more of the local network service device 520, the first remote network service device 540, and the second remote network service device 550. In some implementations, the local network access device 530 can correspond to the local network access device 110, shown in FIG. 1. It is noted the local network access device 530 can, in various implementations, include a stateless network service management engine such as the stateless network service management engine 115 shown in FIG. 1.

In the example of FIG. 5, the user device 535 is coupled to the local network access device 530. In various implementations, the user device 535 can comprise any digital device, as described herein. In various implementations, the user device 535 can request network services from one or more of the local network service device 520, the first remote network service device 540, and the second remote network service device 550.

In the example of FIG. 5, the first remote network service device 540 is coupled to the remote network access device 555. In an implementation, the first remote network service device 540 can provide network services to other devices in the network environment 500. For instance, in various implementations, the first remote network service device 540 can include a networked television that receives content from the remote network access device 555 and provides the content to other devices in the network environment 500. In some implementations, the first remote network service device 540 can be linked to an Internet television service, such as Google® television, Apple® television, or Roku®.

The first remote network service device 540 can include hardware and/or software that implements protocols of the Internet television service.

In various implementations, the first remote network service device 540 receives requests for content from one or more of the other devices in the network environment 500. For instance, the first remote network service device 540 can receive requests for content from the user device 535. The first remote network service device 540 can also receive requests for content from devices in the second building 510. The first remote network service device 540 can satisfy the requests with content from the Internet using the remote network access device 555 and/or the remote switch/router 545, as discussed herein.

In the example of FIG. 5, the remote switch/router 545 is coupled to the remote network access device 555 and to the network trunk 515. In an implementation, the remote switch/router 545 couples the remote network access device 555 (and devices coupled thereto) to the network trunk 515. In various implementation, the remote switch/router 545 can translate protocols used by the remote network access device 555 to network protocols used to communicate over the network trunk 515. The remote switch/router 545 can also provide security for the remote network access device 555 and the devices coupled thereto. More specifically, the remote switch/router 545 can protect the remote network access device 555, the first remote network service device 540, and/or the second remote network service device 550 from rom malicious incoming traffic, and can prevent malicious outgoing traffic from passing to the network trunk 515. Though FIG. 5 shows the remote switch/router 545 as separate from the remote network access device 555, it is noted that in various implementations, the functionalities of the remote switch/router 545 can be incorporated into the remote network access device 555 or vice versa. It is further noted the remote switch/router 545 can include portions of a stateless network service management engine (e.g., the stateless network service management engine 115 shown in FIG. 1).

In the example of FIG. 5, the second remote network service device 550 is coupled to the remote network access device 555. In an implementation, the second remote network service device 550 can provide network services to other devices in the network environment 500. For instance, in various implementations, the second remote network service device 550 can include a networked printer that satisfies print requests from the user device 535 and/or other devices in the second building 510, the first building 505, and/or other portions of the network environment 500.

In the example of FIG. 5, the remote network access device 555 is coupled to the first remote network service device 540, to the remote switch/router 545, and to the second remote network service device 550. In some implementations, the remote network access device 555 can provide the first remote network service device 540, the remote switch/router 545, and the second remote network service device 550 with access to local services and or the network trunk 515. The remote network access device 555 can also provide devices coupled to the local network access device 530 (e.g., the local network service device 520 and/or the user device 535) with access to remote services through the network trunk 515. For instance, the remote network access device 555 can allow the local network service device 520 and/or the user device 535 to access the services of the first remote network service device 540 and/or the second remote network service device 550. In some implementations, the remote network access device 555 can correspond to the remote network access device 125, shown in FIG. 1. It is noted the remote network access device 555 can, in various implementations, include or be compatible with a stateless network service management engine such as the stateless network service management engine 115 shown in FIG. 1.

In various implementations, the local network access device 530 can provide the user device 535 with access to services from the first remote network service device 540, the second remote network service device 550, the remote network access device 555, and/or other devices in the second building 510 without storing cached tables with network-wide lists of available services. More specifically, the local network access device 530 can allow for access to a large number of remote networks (and to large numbers of devices coupled thereto) without having to store tables of remote devices at each of the local network access device 530 and/or the remote network access device 555. The resulting architecture can optimize memory in the local network access device 530 and/or the remote network access device 555.

In some implementations, the local network access device 530 can relay queries for remote network services to peers. For instance, the local network access device 530 can relay queries for remote network services to the remote network access device 555. The local network access device 530 can further instruct the remote network access device 555 to query the first remote network service device 540 and/or the second remote network service device 550 to provide remote network services after the query has been provided to the remote network access device 555. The resulting proxy query can be returned from the remote network access device 555 to the local network access device 530. The local network access device 530 can further provide the requested network services to the user device 535. Accordingly, in various implementations, the user device 535 is able to obtain remote network services from the first remote network service device 540 and/or the second remote network service device 550 without the local network access device 530 storing state tables of all devices in the network environment 500.

Figure 6:
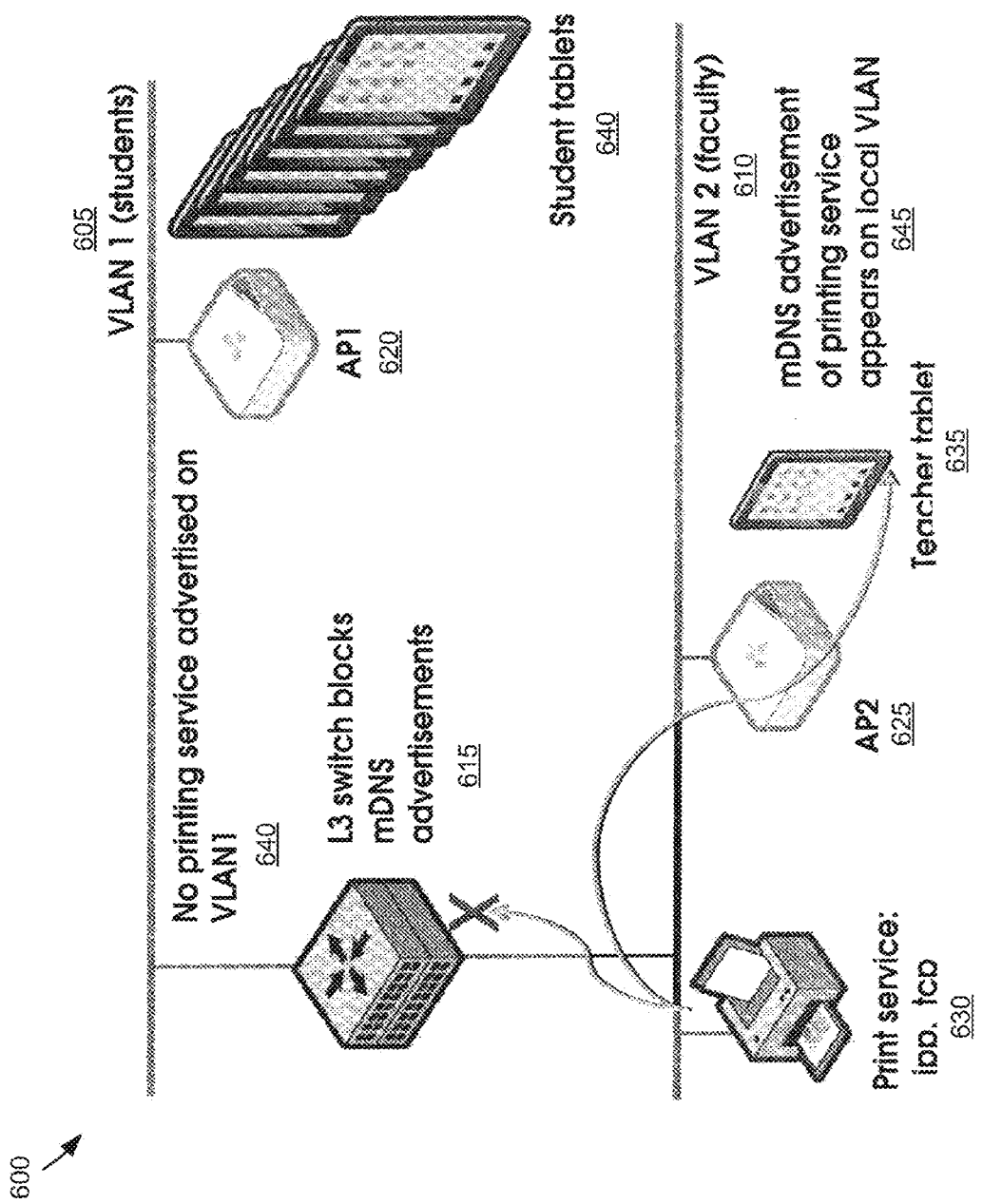
FIG. 6 shows an example of a system using service advertisement processes to form a service discovery realm.

FIG. 6 shows an example of a system 600 using service advertisement processes to form a service discovery realm. In the example of FIG. 6, the system 600 includes a first VLAN 605, a second VLAN 610, a level-3 switch 615, a first access point 620, a second access point 625, a print service 630, a teacher tablet 635, student tablets 640, and an mDNS advertising or printing service 645. In a specific implementation, the first VLAN 605 and the second VLAN 610 are coupled to the level-3 switch 615. Each of the first VLAN 605 and the second VLAN 610 can have associated access points, e.g., the first access point 620 and the second access point 625, respectively. In a specific implementation, the first VLAN 605 is dedicated to, e.g., students, while the second VLAN 610 is dedicated to, e.g., faculty. In such an implementation, the students can access the first VLAN 605 through the first access point 620 and the faculty can access the second VLAN 610 through the second access point 625.

In an implementation the mDNS advertising or printing service 645 is provided to the second VLAN 610. The mDNS advertising or printing service 645 can appear on the second VLAN 610. In various implementations, the level-3 switch 615 can block mDNS advertisements, and prevent mDNS advertisements (e.g., the mDNS advertising or printing service 645) from reaching the first VLAN 605. This may or may not be desirable, depending on the implementation.

Figure 7:
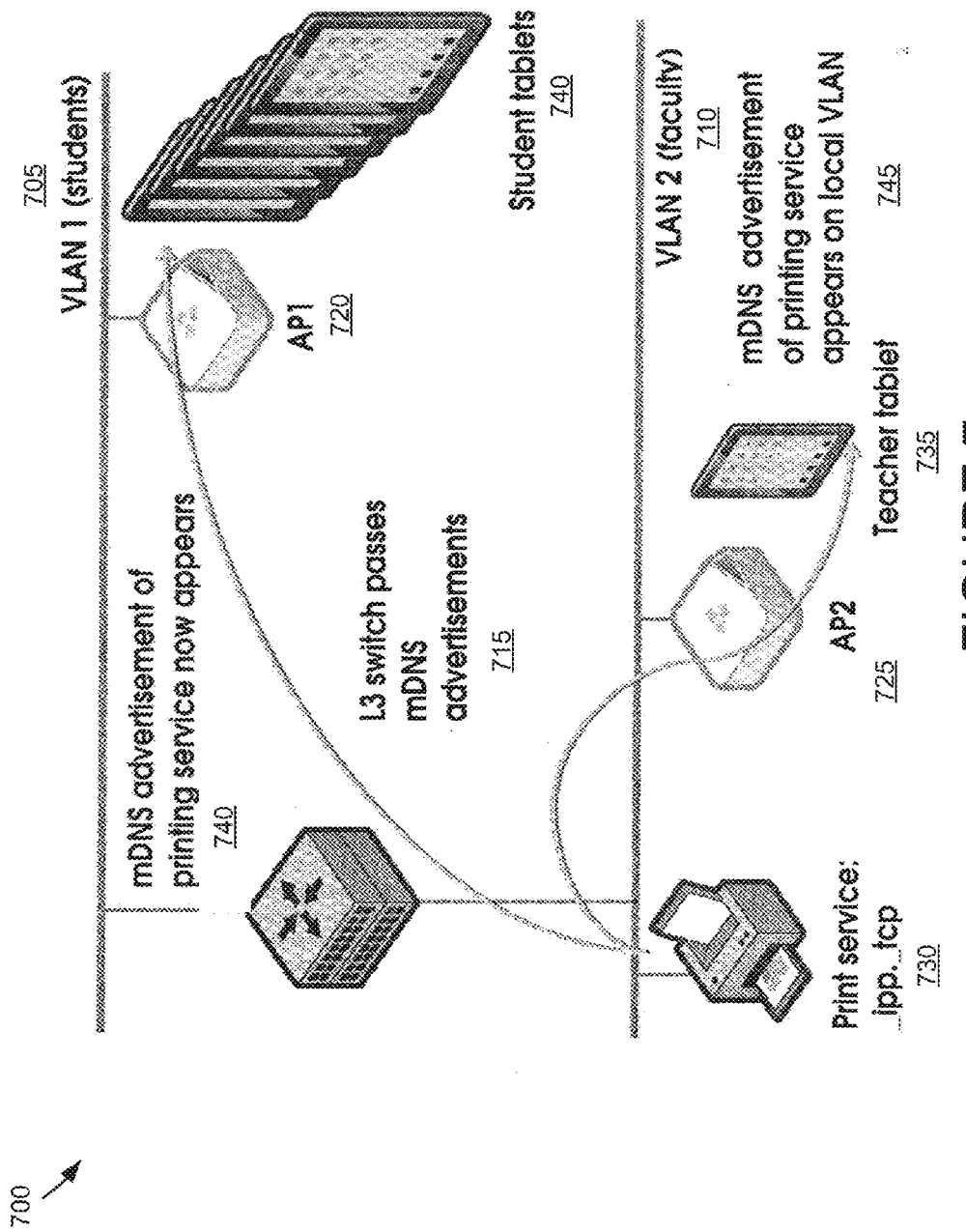
FIG. 7 shows an example of a system using service advertisement processes to form a service discovery realm.

FIG. 7 shows an example of a system 700 using service advertisement processes to form a service discovery realm. In the example of FIG. 7, the system 700 includes a first VLAN 705, a second VLAN 710, a level-3 switch 715, a first access point 720, a second access point 725, a print service 730, a teacher tablet 735, student tablets 740, and an mDNS advertising or printing service 745. In a specific implementation, the first VLAN 705 and the second VLAN 710 are coupled to the level-3 switch 715. Each of the first VLAN 705 and the second VLAN 710 can have associated access points, e.g., the first access point 720 and the second access point 725, respectively. In an implementation, the first VLAN 705 can be dedicated to students, while the second VLAN 710 can be dedicated to faculty. The students can access the first VLAN 705 through the first access point 720, while the faculty can access the second VLAN 710 through the second access point 725.

In a specific implementation, it may be desirable for the student tablets 740 on the first VLAN 1 to be able to see the mDNS advertising or printing service 745 on the second VLAN 710. Such visibility can be achieved, in some implementations, if the level-3 switch 715 allows for forwarding or duplication of mDNS advertisements, the printing service will be advertised on both the first VLAN 705 and the second VLAN 710. However, in these implementations, faculty could be able to see services advertised by student tablets 740, such as _game._tcp perhaps, which may not be desirable.

More specifically, in various implementations, the stateless network service management engine 115 can receive from the user device 105 a request for remote network services (e.g., network services associated with the first remote network service provider device 130 and/or the second remote network service provider device 135). The stateless network service management engine 115 can further relay the request to the remote network access device 125. The stateless network service management engine 115 can instruct the remote network access device 125 to query network service devices (e.g., the first remote network service provider device 130 and/or the second remote network service provider device 135) for the requested network service. If the requested network service is supported, the stateless network service management engine 115 can receive the network service from the remote network access device 125. It is noted the stateless network service management engine 115 need not store a state of either the first remote network service provider device 130 or the second remote network service provider device 135 in these implementations.

In some implementations, the first access point 720 can include a stateless network service management engine, such as the stateless network service management engine 115 shown in FIG. 1. In these implementations, the first access point 720 can receive from one or more of the student tablets 740 a request for remote network services, such as the print service 730. The first access point 720 can relay the request to the second access point 725. The first access point 720 can instruct the second access point 725 to query the devices coupled thereto (e.g., the print service 730 and/or the teacher tablet 735) for the requested print service. The second access point 725 can receive from the print service 730 an indication that the print service 730 is available. The second access point 725 can provide the print service 730 to the first access point 720. As a result, the first access point 720 need not store a state of the print service 730 and/or the teacher tablet 735.

Figure 8:
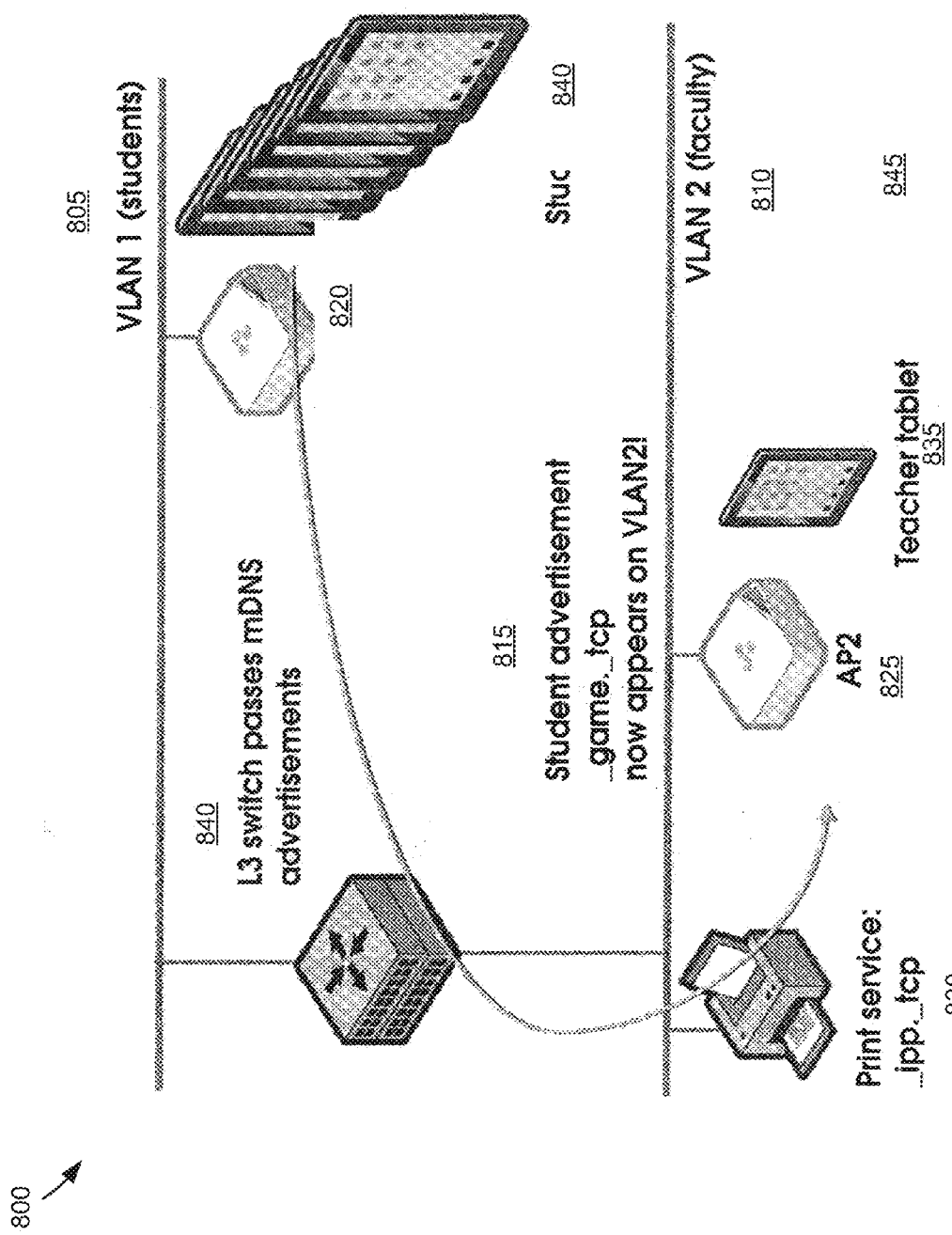
FIG. 8 shows an example of a system using service advertisement processes to form a service discovery realm.

FIG. 8 shows an example of a system 800 using service advertisement processes to form a service discovery realm. In the example of FIG. 8, the system 800 includes a first VLAN 805, a second VLAN 810, a level-3 switch 815, a first access point 820, a second access point 825, a print service 830, a teacher tablet 835, student tablets 840, and an mDNS advertising or printing service 845. In a specific implementation, the first VLAN 805 and the second VLAN 810 are coupled to the level-3 switch 815. Each of the first VLAN 805 and the second VLAN 810 can have associated access points, e.g., the first access point 820 and the second access point 825, respectively. In an implementation, the first VLAN 805 can be dedicated to students, while the second VLAN 810 can be dedicated to faculty. The students can access the first VLAN 805 through the first access point 820, while the faculty can access the second VLAN 810 through the second access point 825.

In an implementation, the students and faculty can be able to see all services available on both the first VLAN 805 and the second VLAN 810. Some implementations address various needs for an efficient process of selectively limiting the network-wide visibility of certain services, and also to limit the total number of services advertised in order for the transmission of advertisements to be manageable and useful to network users. Furthermore, all the services on all subnets in a multi-subnet network may be an extremely large set of services and may be unmanageable to transmit to all network users. Various implementations address various needs for processes to manage the volume of services being advertised within any one subnet. In some implementations, the first access point 820 can include a stateless network service management engine, such as the stateless network service management engine 115 shown in FIG. 1. The first access point 820 can provide one or more of the student tablets 840 with access to the print service 830 without the first access point 820 storing state tables related to the print service 820 and/or the teacher tablet 835.

Figure 9:
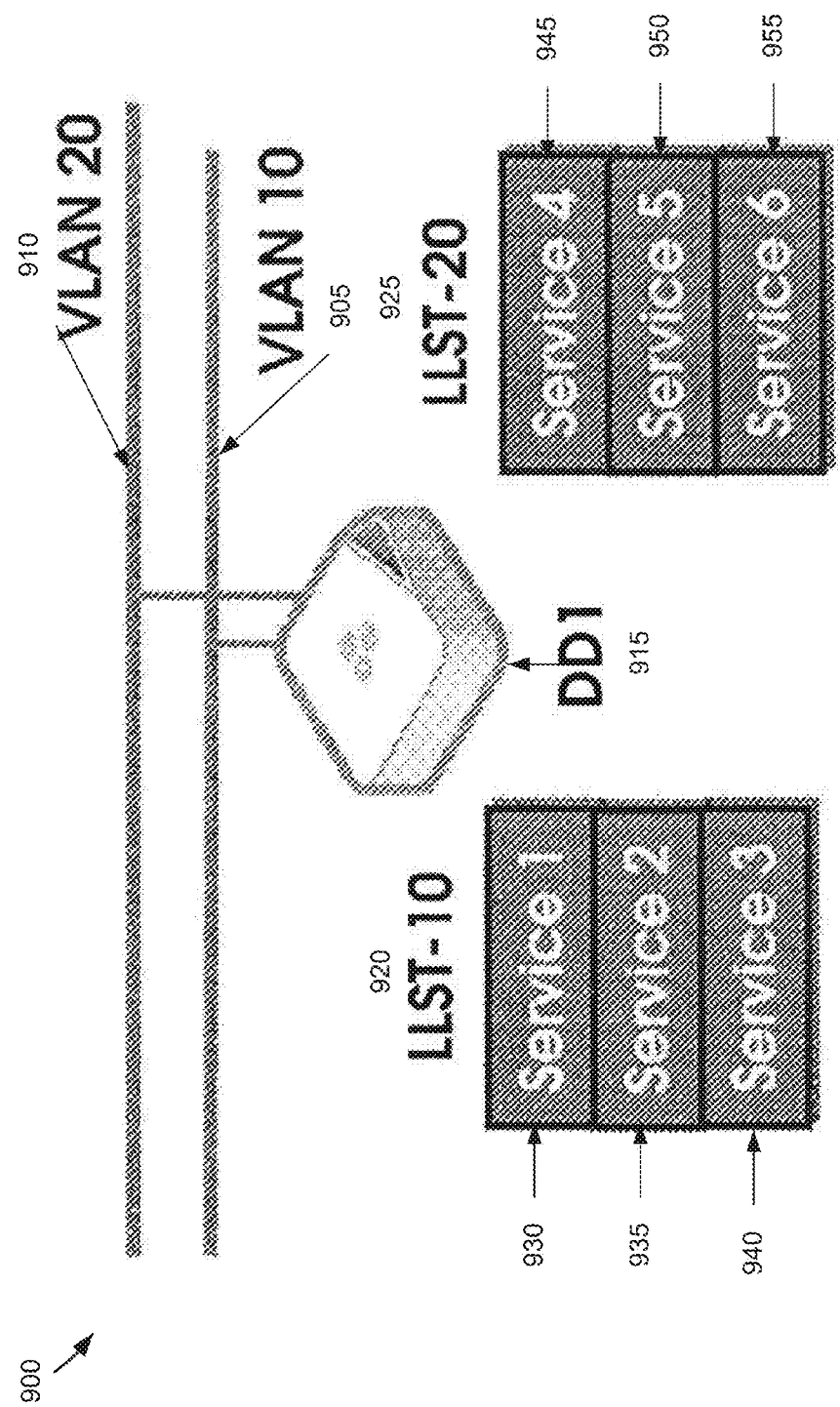
FIG. 9 shows an example of a system using local level collection of service advertisements by a network device.

FIG. 9 shows an example of a system 900 using local level collection of service advertisements by a network device. In the example of FIG. 9, the system 900 includes a first VLAN 905, a second VLAN 910, a network access device 915, a first filtered service listing 920, and a second filtered service listing 925. The first filtered service listing 920 includes a first service 930, a second service 935, and a third service 940. The second filtered service listing 925 includes a fourth service 945, a fifth service 950, and a sixth service 955. In a specific implementation, the system 900 uses designated network devices, such as APs, at the local, subnet level to collect and filter service advertisements (services advertised using a mDNS service advertisement protocol, for example), send the filtered service advertisements to a higher level designated network device for creation of a list of services available across a multiplicity of subnets, and then send the list to the local level designated network devices to allow for proxy service advertisements (proxy advertisements are permitted in mDNS service advertisement protocol) from across the multiplicity of subnets to be transmitted on all subnets.

In an implementation, a designated network device (DD1) is shown collecting service advertisements on the local network level for both VLAN 10 and VLAN 20. These local level service advertisements are provided by a service advertisement protocol such as Bonjour using mDNS. DD1 creates link-level service tables (LLST)—LLST-10 and LLST-20, for the subnets associated with the VLAN 10 and the VLAN 20, respectively. LLST-10 and LLST-20 are stored in memory on DD1. In this example, LLST-10 lists services 1-3 which are advertised on VLAN 10 and LLST-20 lists services 4-6 which are advertised on VLAN 20. FIG. 9 represents part of a larger network which includes a plurality of subnets associated with the VLAN 10, VLAN 20 . . . VLAN 50, as illustrated in FIG. 10.

In a specific implementation, examples can include for service advertisement protocols using mDNS, such as Bonjour. However, the concepts herein may be implemented with service advertisement protocols such as UPnP. Furthermore, the concepts herein may be implemented with NetBIOS Name Service.

In an implementation, a process for managing service advertisement across a plurality of subnets according to some implementations may include: collecting service advertisements on the local network level by designated network devices and creating link-level tables of the available services for each subnet with a designated network device (note that not all subnets will necessarily have a designated network device, since a designated device is only needed on subnets with services for which service advertisements are desired to be transmitted across the plurality of subnets); filtering the local service advertisements in the tables by the designated network devices to provide filtered listings of services; sending the filtered listings from each designated network device to a designated master network device (and preferably to a designated back-up master network device) and combining the filtered listings at the designated master network device to form a table of filtered service advertisements; and sending the table of filtered service advertisements to all designated network devices, such that each designated network device maintains a service discovery proxy table listing the filtered services on the plurality of subnets.

Figure 10:
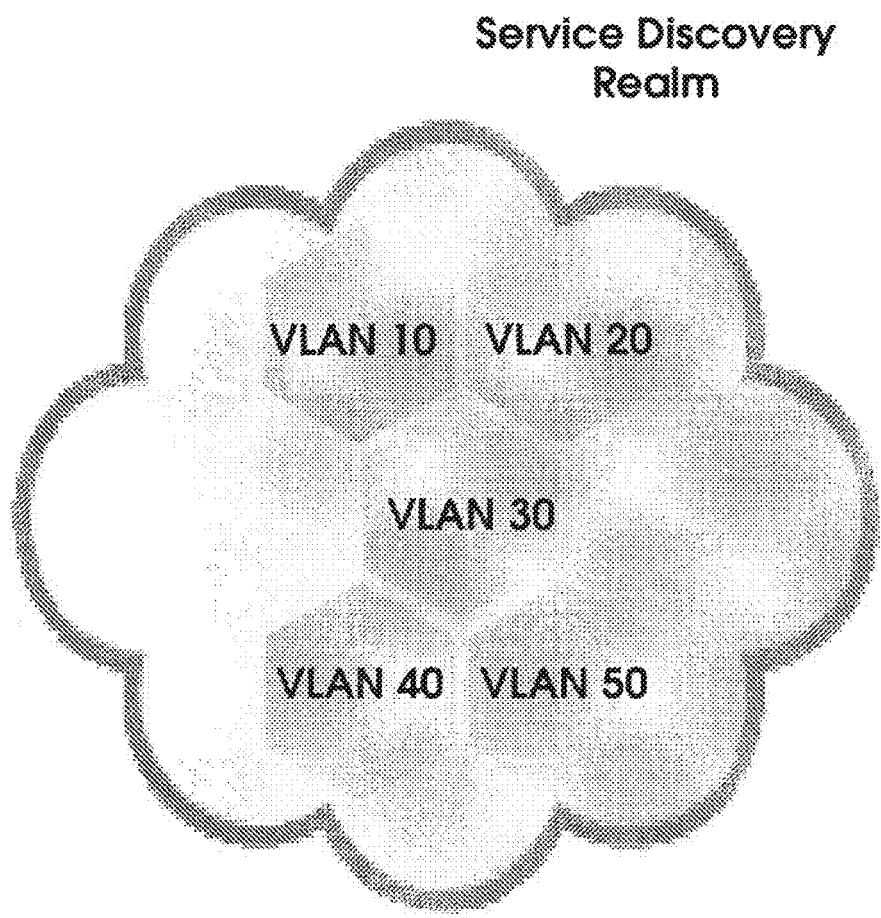
FIG. 10 shows an example of a system comprising a plurality of Virtual Local Area Networks (VLANs) combined to form a service discovery realm.

FIG. 10 shows an example of a system 1000 comprising a plurality of Virtual Local Area Networks (VLANs) combined to form a service discovery realm. The five subnets in FIG. 10 are referred to herein as a service discovery realm. The term realm is used so as to be clear that the grouping of subnets need not in all cases correspond to a complete network—in other words there may be more than one realm within a network. The number of subnets within a realm may be within the range of 2 to tens of thousands or more. On a practical level a limitation to the number of subnets may be determined by the memory and processing requirements in the designated devices required for the service advertisements not in a designated device's subnet. The subnets may be local area networks (LANs) or virtual LANs (VLANs), and preferably each VLAN is a single IP subnet. A realm may correspond to a geographical region, such as one building on a company campus, or to an organizational division, such as an engineering group, where sharing advertised services is beneficial. A realm corresponding to a geographical region is beneficial when services such as printing are being advertised—a user is unlikely to be interested in a printing service across the other side of a large company campus and will only want to see those in close geographical proximity, and thus a realm of limited geographical extent is beneficial. A realm corresponding to a particular organizational division may be beneficial if the division is spread out geographically but wishes to share software tools, datafiles, presentations, etc.

To provide a specific example of a realm, consider Kindergarten through 12th grade school districts. The realm is likely to be either a single school building, or the entire district. Where districts are reasonably small—for a small city—the district may be a realm. Where the district is county-wide, and may have almost 10,000 APs, there may be multiple realms—these realms may be either a particular slice of the district (elementary/middle/high schools in three realms) or individual schools.

These service discovery realms may be user defined or may be determined automatically. An example of the latter is a large set of cooperative control APs which cover a continuous area which automatically organize into coverage sub-areas, where each sub-area is a realm. A further example is a network for a company with three locations worldwide and the APs self-organize into realms that form continuous coverage areas, in this case three realms one for each location. When wireless APs are used, the wireless coverage areas of adjacent APs within a realm will often be spatially overlapping.

A designated network device, DD, is needed for each subnet in a realm. The number of designated devices may correspond to the number of subnets in a realm, or, as shown in FIG. 9, multiple subnets may share a common designated device. There may also be a second DD for each subnet which acts as a back-up. Lower level designated devices may be network devices such as access points (APs), a specific example being the cooperative control AP—the HiveAP device—available from Aerohive Networks, Inc. Furthermore, designated devices may be routers, switches and even special software running on servers or virtual machines The realm level designated devices may also by APs, or may be controllers in networks that have centralized control. Furthermore, the realm level designated devices may be any of the network devices described above for lower level designated devices. A network device, such as an AP, may double as both a lower level and a realm level designated device. Where there are many suitable network devices on a subnet an election process may be used to designate one device and a back-up. For example, the first AP coming up on a VLAN is the DD, and the second the back-up, or the device with the lowest MAC address is the DD and the next lowest is the back-up. Similarly, for each realm a master realm device and a back-up device are designated. In one embodiment, the set of lower level designated devices elect one of the set to be realm master and a second to be back-up realm master. Two realm level devices are preferred to provide for seamless backup when the master dies. Having two realm level devices also reduces the O(NA2) problem of synchronizing between subnets to O(N). (If you have N devices, you need to have N*(N−1) connections between all of them in a full mesh, but if you have designated devices acting as master and backup master, you only need 2N connections—the load on the network is reduced.).

To share information between designated devices, a communication protocol built on top of the Internet Protocol (IP) can be used. The communication carries a list of services to be shared along with the network address for each service. By building the communication protocol between designated devices on IP, it can span any physical distance covered by an IP network and traverse a network built out of nearly any networking component available for sale today.

Figure 11:
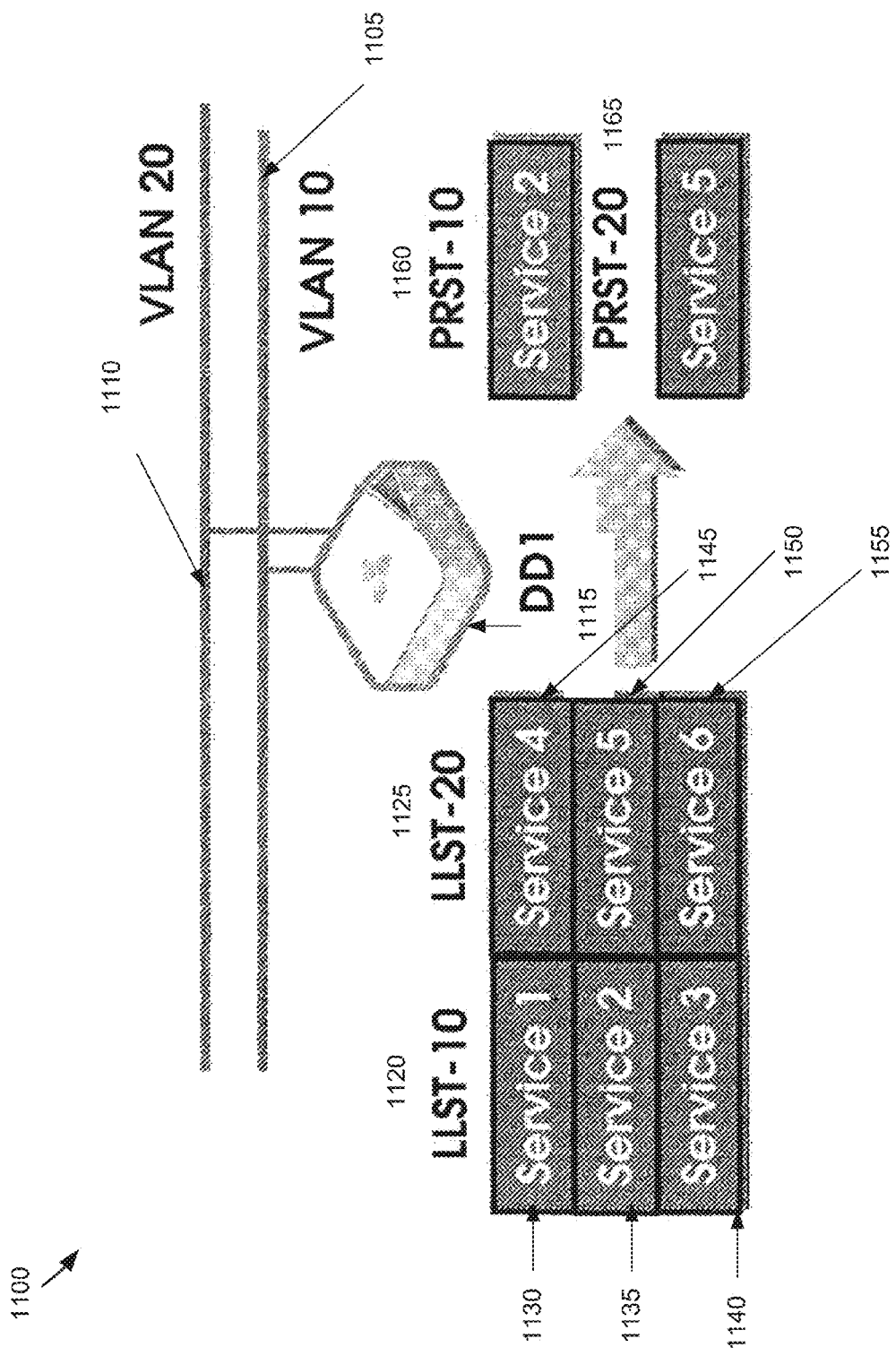
FIG. 11 shows an example of a system for filtering of local level service advertisements by a network device.

FIG. 11 shows an example of a system 1100 for filtering of local level service advertisements by a network device. In the example of FIG. 11, the system 1100 includes a first VLAN 1105, a second VLAN 1110, a network access device 1115, a first filtered service listing 1120, and a second filtered service listing 1125. The first filtered service listing 1120 includes a first service 1130, a second service 1135, and a third service 1140. The second filtered service listing 1125 includes a fourth service 1145, a fifth service 1150, and a sixth service 1155. In the example of FIG. 11, the system 1100 further includes a first service 1160 included in first Partial Realm Service Tables, and a second service 1165 included in second Partial Realm Service Tables.

In a specific implementation, the network access device 1115 is shown filtering the local service advertisements on the first filtered service listing 1120 and the second filtered service listing 1125 to provide corresponding lists of filtered services for each subnet—partial realm service tables (i.e., the filtered service listing 1120 and the second filtered service listing 1125).

The filtering is executed by a processor on the network access device 1115 and the partial realm service tables are stored in memory on the network access device 1115. (The tables are preferably also stored in memory on a back-up designated device. The tables may also be stored on disk.) Filter rules may be consistent throughout a realm or may be custom for each subnet within a realm. An example of a filter rule for (1) a realm corresponding to a single building on a campus is to allow all printing services to be advertised providing the building is not too large, and (2) a realm including geographically disparate locations is to exclude all printing services, thus only printing services on a local level will be advertised. Filters may be used to restrict access to certain services by not advertising them beyond their local network. In the example in FIG. 11, the filter removes the first service 1130 and the third service 1140 from the first filtered service listing 1120, and the fourth service 1145 and the sixth service 1155 from the second filtered service listing 1125. Thus, the second service 1135 is included in the first filtered service listing 1120 and the fourth service 1145 is included in the second filtered service listing 1125. The network access device 1115 can then send the partial realm service tables to a master realm designated device (MRDD). Filtering rules may be based on regular expressions. For example: match "ipp._tcp" exactly will match exactly one service—the IPP (Internet Printing Protocol); match "_i*.tcp" will match any TCP service that begins with the letter I, and thus will match IPP as above, but it will also match "_ipodconfiguration.tcp"; or match "*._tcp" will match any TCP service.

Figure 12:
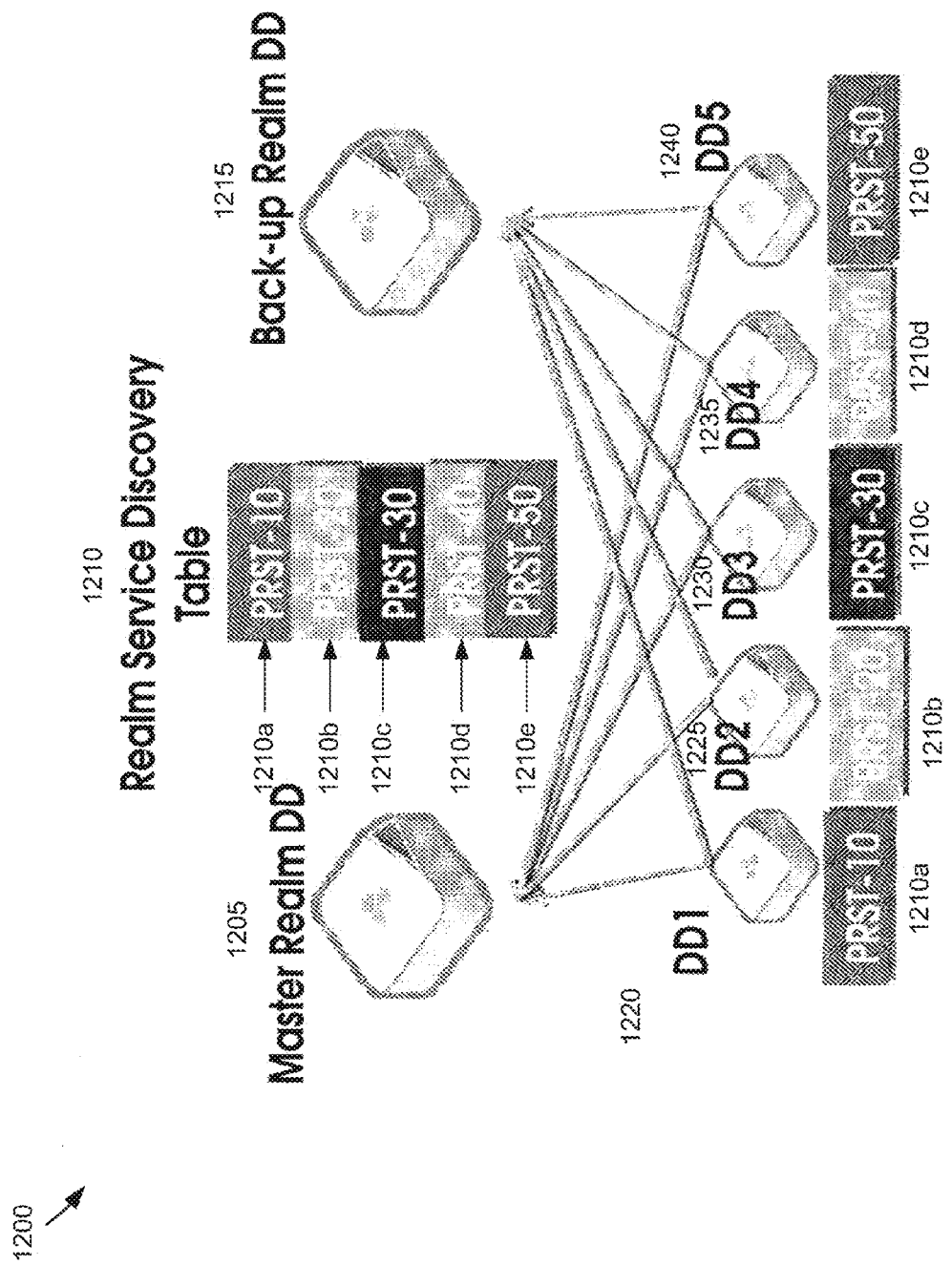
FIG. 12 shows an example of a system including local level designated network devices sending filtered local level service advertisements to a realm level designated network device and a realm level back-up device, where a consolidated table of filtered service advertisements for the entire realm is created.

FIG. 12 shows an example of a system 1200 including local level designated network devices sending filtered local level service advertisements to a realm level designated network device and a realm level back-up device, where a consolidated table of filtered service advertisements for the entire realm is created. In the example of FIG. 12, the system 1200 includes a master realm network access device 1205, a list of PRSTs 1210 and a back-up realm network access device 1215. The list of PRSTs 1210 can include a first PRST 1210*a*, a second PRST 1210*b*, a third PRST 1210*c*, a fourth PRST 1210*d*, and a fifth PRST 1210*e*. The system 1200 further includes a first designated device 1220, a second designated device 1225, a third designated device 1230, a fourth designated device 1235, and a fifth designated device 1240.

In a specific implementation, the back-up realm network access device 1215 acts as a back-up to the master realm network access device 1205. Moreover, in an implementation, the first designated device 1220, the third designated device 1230, and the fifth designated device 1240 can send partial realm service tables to the master realm network access device 1205 and the back-up realm network access device 1215, where they are stored in memory. In various implementations, the realm level DDs separately combine the PRSTs to create a realm service discovery table (RSDT) which is stored in memory. (The tables—PRSTs and RSDT—are preferably also stored in memory on a back-up master designated device. The tables may also be stored on disk). The master realm network access device 1250 can then send the RSDT to each DD (i.e., the first designated device 1220, the second designated device 1225, the third designated device 1230, the fourth designated device 1235, and the fifth designated device 1240) for each subnet—the RSTD is stored in memory on each designated device. (The tables are preferably also stored in memory on a back-up designated device. The tables may also be stored on disk.) Note that in FIG. 12 separate first designated device 1220 and second designated device 1225 are shown for the VLAN 10 and VLAN 20, although in alternative configurations, the VLAN 10 and the VLAN 20 may have a common designated device, as shown in FIG. 9. Furthermore, a single designated device may be used if it can be plugged into a trunk port that is connected to all VLANs, in which case it receives all service advertisements, and can maintain the entire network state table without having to synchronize between devices. The back-up realm network access device 1215 may be triggered into action on receipt of a message that the designated master network device is not communicating with the designated network devices or by being unable to communicate with the master device over several seconds, in which case the designated back-up master network device sends the realm service discovery table to the designated network devices on the plurality of subnets in the realm.

Figure 13:
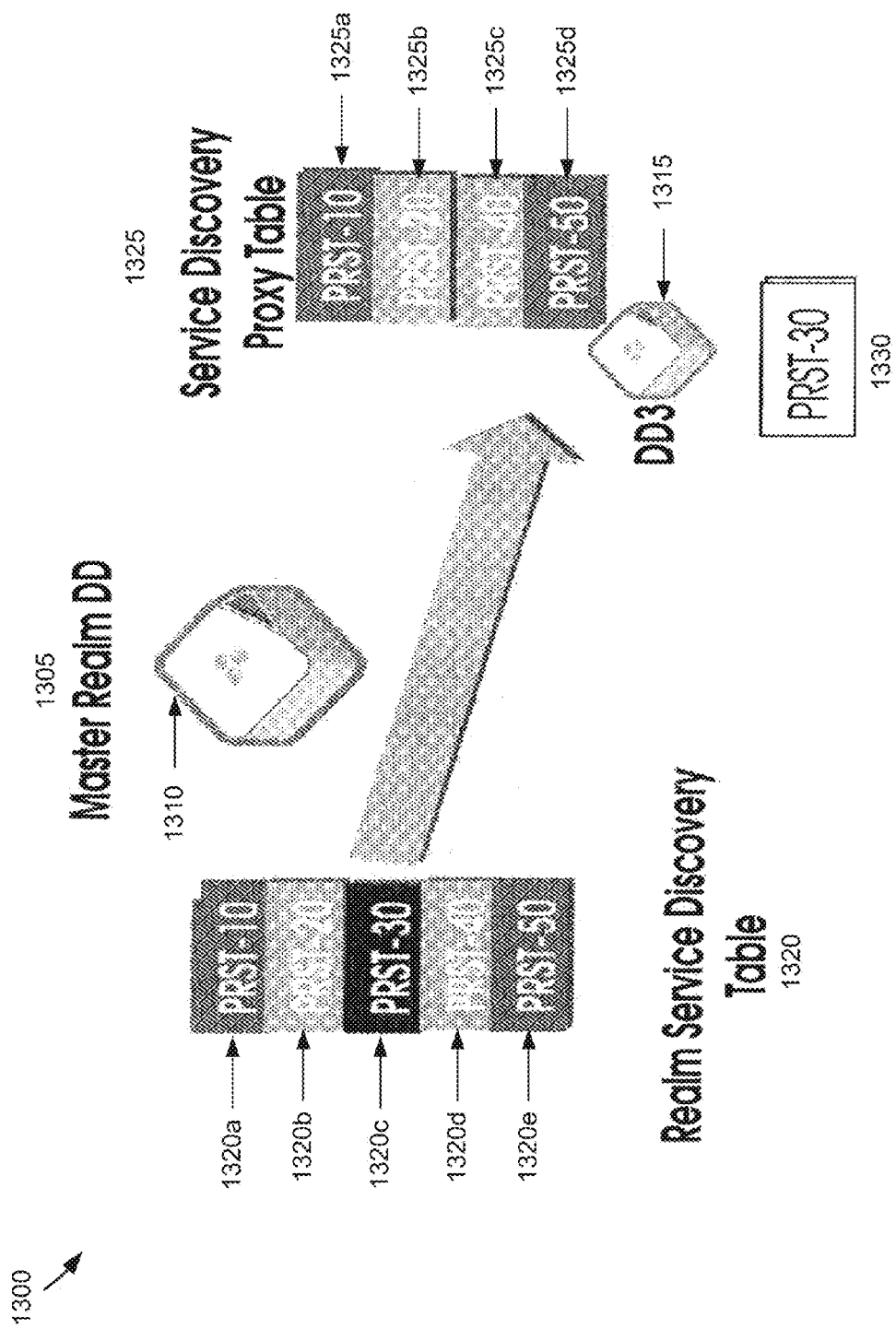
FIG. 13 shows an example of a system for sending of the realm level table of service advertisements to one of the local level designated devices, the local level device then creating a proxy table of realm level service advertisements for transmitting on the local subnet.

FIG. 13 shows an example of a system 1300 for sending of the realm level table of service advertisements to one of the local level designated devices, the local level device then creating a proxy table of realm level service advertisements for transmitting on the local subnet. In the example of FIG. 13, the system 1300 includes a master realm designated device 1305 (shown by the first network access device 1310), a second network access device 1315, a realm service discovery table 1320, a service discovery proxy table 1325, and a PRST 1330. In an implementation, the master realm designated device 1305 can send the realm service discovery table 1320 to the first network access device 1310—the same designated device that that collected and filtered the local level advertisements on the subnet. In this implementation, the first network access device 1310 can also create a service discovery proxy table which includes the services available realm-wide, excluding those available on the local subnet. The service discovery proxy table is stored in memory on the second network access device 1315. For example, the second network access device 1315 can create a proxy table including the services available on VLAN 10, VLAN 20, VLAN 40 and VLAN 50, excluding the services available locally on VLAN 30.

Figure 14:
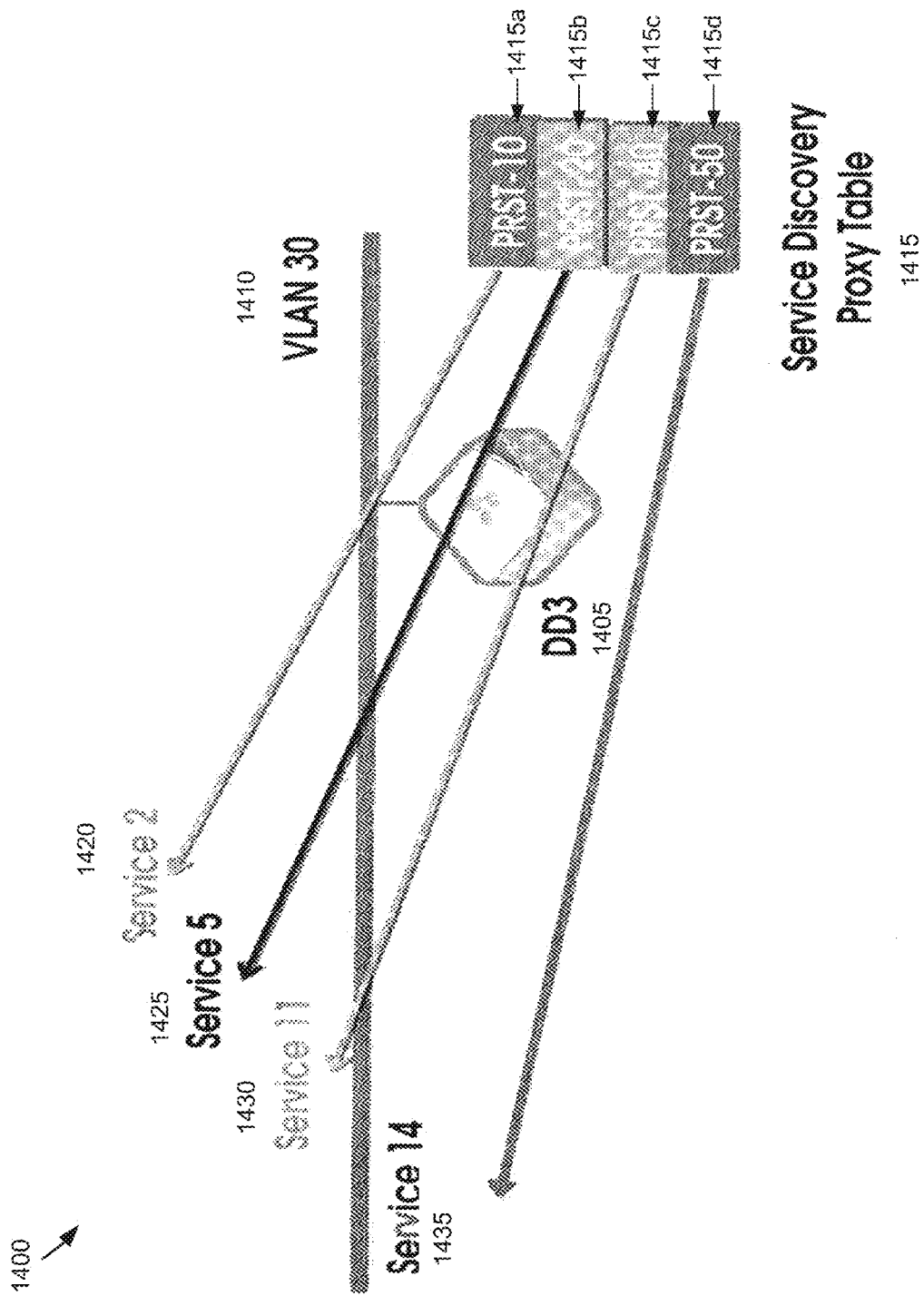
FIG. 14 shows an example of a system for transmitting over the local subnet of the proxy table of realm level service advertisements.

FIG. 14 shows an example of a system 1400 for transmitting over the local subnet of the proxy table of realm level service advertisements. In the example of FIG. 14, the system 1400 includes a network access device 1405, a VLAN 1410, a service discovery proxy table 1415, service 2 1420, service 5 1425, service 11 1430, and service 14 1435. In an implementation, the network access device 1405 can transmit the service discovery proxy table 1415 to its local submit, i.e., to the VLAN 1410. This transmitting may be efficiently executed by periodically transmitting mDNS messages on the VLAN 1410 to advertise all services in the proxy table. In FIG. 14, the network access device 1405 is shown advertising on the VLAN 1410 the service 2 1420, the service 5 1425, the service 11 1430, and the service 14 1435, each of which are available on various VLANS, including, e.g., VLAN 10, VLAN 20, VLAN 40 and VLAN 50, respectively. Note that the RSDT received by the network access device 1405 which covers the subnet of the network access device 1405 is used for comparison to assist in determining when a new service needs to be reported to the master realm DD for adding to the RSDT or when an old service is no longer being advertised and needs to be reported to the master realm DD for removal from the RSDT. Typically it is desired that RSDTs are republished with all updates approximately every 5 seconds. For example, when a new service is added to a subnet, the service advertisement would be identified as new by comparison with the subnet's RSDT, if it passes the filter information is then sent to the realm master designated device identifying the addition of a new service. From the realm master designated device the service advertisement is sent out to all designated devices on all subnets in the realm and proxy advertised on these subnets. It is desirable to have this updating process completed within approximately 5 seconds. Note that on the subnet of the new service, the service creator continues sending a service advertisement every couple of seconds for this new service; however, it is not this repeating service advertisement that is propagated to the realm level, merely the information that the service needs to be added or removed from the RSDT. Consequently, the process of the present invention produces a lesser load on routers compared to networks in which the routers allow forwarding or duplicating of mDNS advertisements, as described herein.

Figure 15:
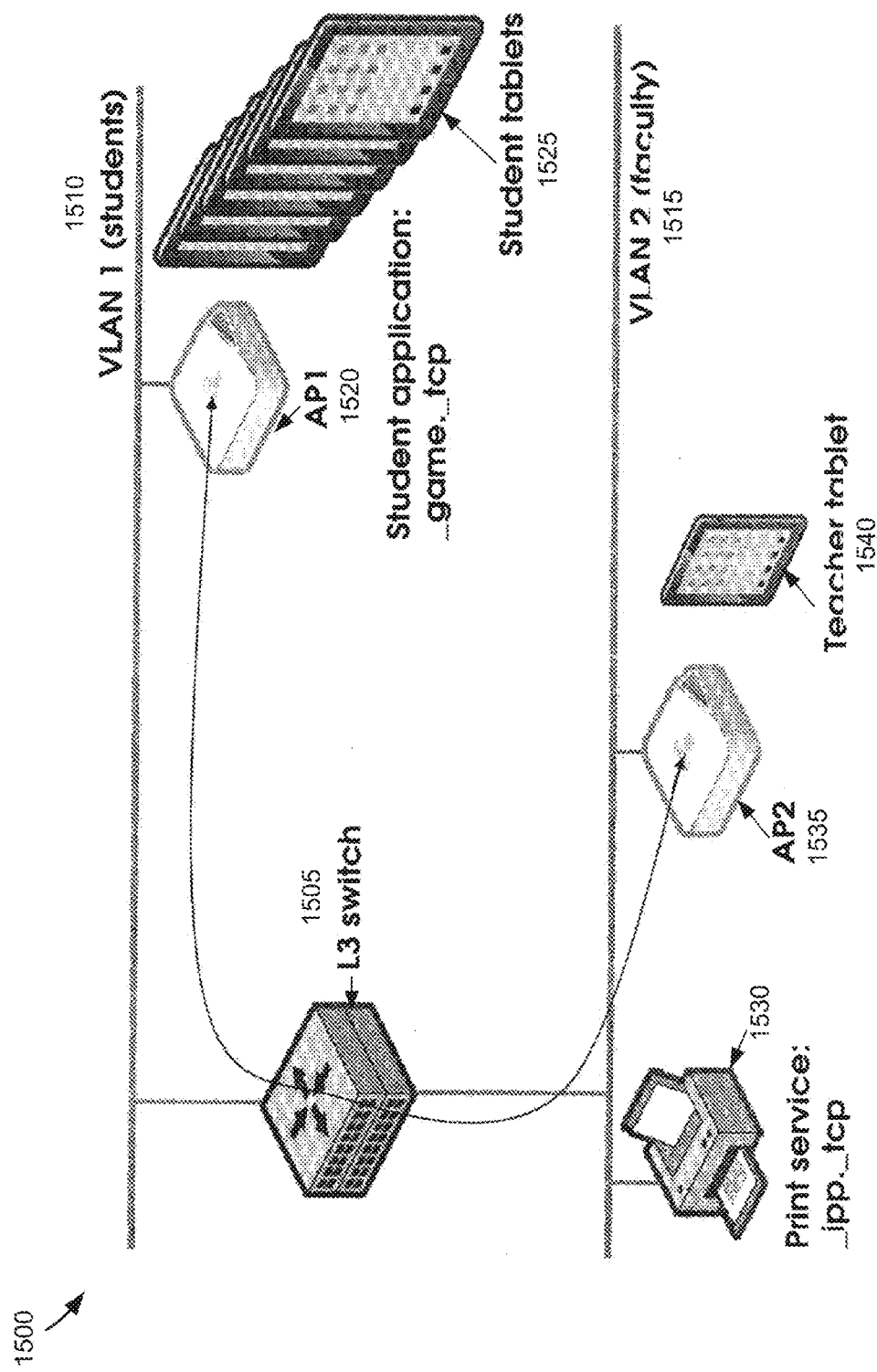
FIG. 15 shows an example of a system including a network topology using service advertisement processes to form a service discovery realm.

FIG. 15 shows a system 1500 including a network topology using service advertisement processes to form a service discovery realm. In the example of FIG. 15, the system 1500 includes a level-3 switch 1505, a first VLAN 1510, a second VLAN 1515, a first access point 1520, student tablets 1525, a print service 1530, a second access point 1535, and a teacher tablet 1540. In a specific implementation, the first access point 1520 and the second access point 1535 can be designated as network devices for the first VLAN 1510 and the second VLAN 1515, respectively.

In an specific implementation, the second access point 1535 can double as a designated master network device, and the first access point 1520 can double as a designated back-up master network device. The process of these implementations may be applied to this network as described herein, to provide service advertisement across both the first VLAN 1510 and the second VLAN 1515 without requiring the level-3 switch 1505 to be specially adapted for forwarding or duplication of mDNS advertisements. Furthermore, filtering of service advertisements may be readily carried out according to the present invention. For example, the service advertisement from a printer for the print service 1530 on the second VLAN 1515 can be blocked by the level-3 switch 1505, but is collected by the second access point 1535 and is incorporated into a table of services. The table is sent to the first access point 1520 so that the print service 1530 may be proxy advertised on the first VLAN 1510 by the first access point 1520. Furthermore, the student_game._tcp which is advertised on the first VLAN 1510 is collected by the first access point 1520, and may be filtered so that it is not added to a table of services on the first VLAN 1510 (and thus is not sent to the second access point 1535 for proxy advertisement on the second VLAN 1515). As indicated by the double-headed arrow, the communication between the first access point 1520 and the second access point 1535 controls service advertisement for services beyond the local subnet.

Figure 16:
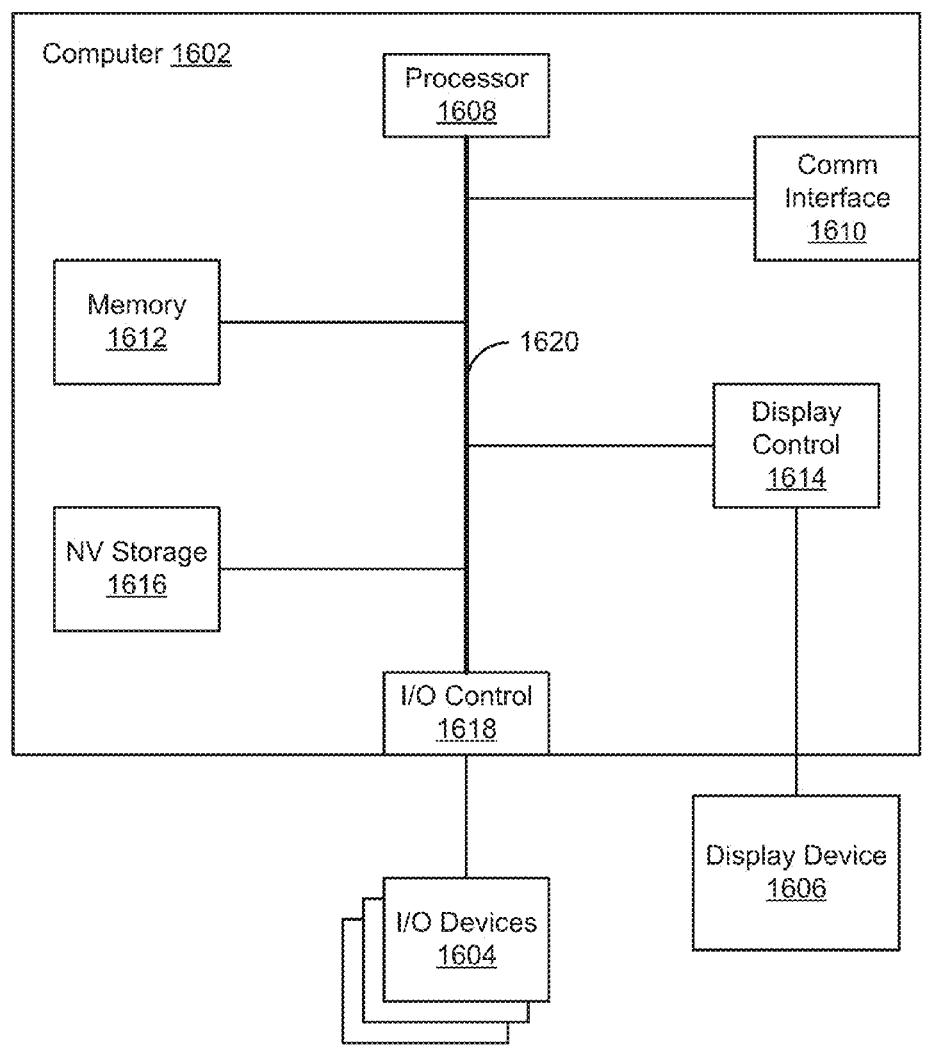
FIG. 16 shows an example of a digital device.

FIG. 16 shows an example of a digital device 1600. In the example of FIG. 16, the digital device 1600 can be a conventional computer system that can be used as a client computer system, such as a wireless client or a workstation, or a server computer system. In an implementation, the digital device 1600 includes a computer 1602, I/O devices 1604, and a display device 1606. The computer 1602 can include a processor 1608, a communications interface 1610, memory 1612, a display controller 1614, non-volatile storage 1616, and an I/O controller 1618. In some implementations, the computer 1602 is coupled to or includes the I/O devices 1604 and/or the display device 1606.

In an implementation, the computer 1602 interfaces to external systems through the communications interface 1610, which can include a modem or network interface. It will be appreciated that the communications interface 1610 can be considered to be part of the digital device 1600 or a part of the computer 1602. The communications interface 1610 can be an analog modem, ISDN modem, cable modem, token ring interface, satellite transmission interface (e.g. "direct PC"), or other interfaces for coupling a computer system to other computer systems, in various implementations.

In various implementations, the processor 1608 can include any processor. In some implementations the processor 1608 can include a microprocessor, such as an Intel Pentium® microprocessor or Motorola® power PC microprocessor. The memory 1612 can be coupled to the processor 1608 by a bus 1620. The memory 1612 can be Dynamic Random Access Memory (DRAM) and can also include Static RAM (SRAM). The bus 1620 can couple the processor 1608 to the memory 1612, also to the non-volatile storage 1616, to the display controller 1614, and/or to the I/O controller 1618.

In some implementations, the I/O devices 1604 can include any devices used to provide input to the digital device 1600 or to facilitate outputs from the digital device 1600. In various implementations, the I/O device 1605 can include one or more of: a keyboard, disk drives, printers, a scanner, and other input and output devices, including a mouse or other pointing device. The display controller 1614 can control a display on the display device 1606, which can be, for example, a cathode ray tube (CRT) or liquid crystal display (LCD). The display controller 1614 and the I/O controller 1618 can be implemented with conventional well known technology.

In a specific implementation, the non-volatile storage 1616 can include any form of non-volatile storage. In some implementations, the non-volatile storage 1616 can include one or more of: magnetic hard disk, an optical disk, or another form of storage for large amounts of data. Some of this data is often written, by a direct memory access process, into memory 1612 during execution of software in the computer 1602. It is noted that the terms "machine-readable medium" or "computer-readable medium," as used in this paper, can include any type of storage device that is accessible by the processor 1608 and also encompasses a carrier wave that encodes a data signal.

In the example of FIG. 16, the digital device 1600 is one example of many possible computer systems which have different architectures. For example, personal computers based on an Intel® processor and/or microprocessor can have multiple buses, one of which can be an I/O bus for the peripherals and one that directly connects the processor 1608 and the memory 1612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1612 for execution by the processor 1608. A Web TV system, which is known in the art, is also considered to be a computer system, but it can lack some of the features shown in FIG. 16, such as certain input or output devices. A typical computer system will usually include at least a processor, memory, and a bus coupling the memory to the processor.

Figure 17:
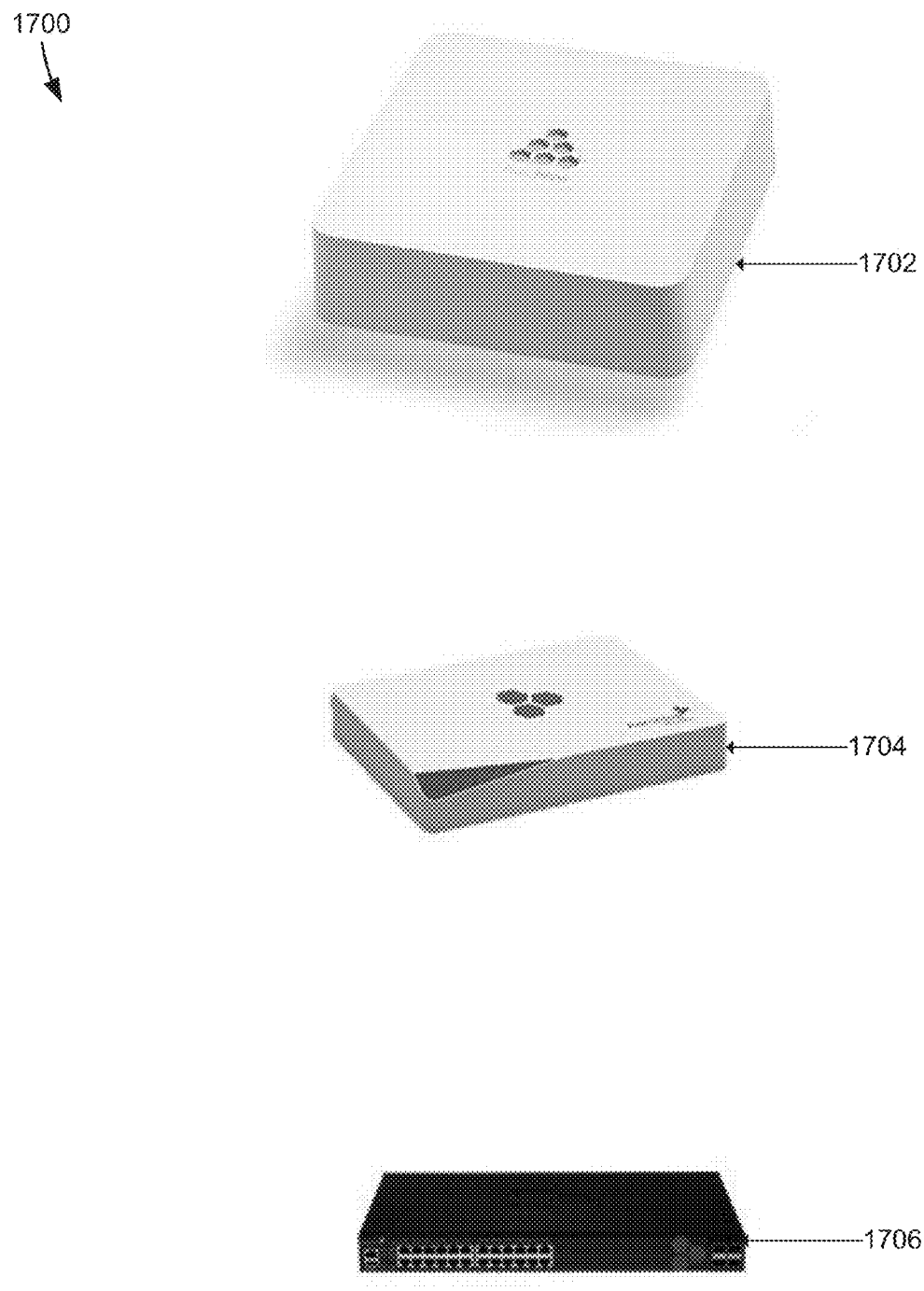
FIG. 17 shows examples of a plurality of network access devices.

FIG. 17 shows examples of a plurality of network access devices 1700, according to some embodiments. In the example of FIG. 17, the network access devices 1700 can include an access point 1705, a router 1710, and a switch 1715. One or more of the access point 1705, the router 1710, and the switch 1715 can contain at least portions of the systems and modules described herein. More specifically, in various implementations, one or more of the access point 1705, the router 1710, and the switch 1715 may correspond to one or more of the local network access device 110 and the remote network access device 125, shown in FIG. 1. In some implementations, one or more of the access point 1705, the router 1710, and the switch 1715 can include the stateless network service management engine 115, shown in FIG. 1 and described in greater detail herein.

This paper describes techniques that those of skill in the art can implement in numerous ways. For instance, those of skill in the art can implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

A detailed description of one or more implementations of the invention is provided in this paper along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer-readable storage medium, such as, but is not limited to, read-only memories (ROMs), random access memories (RAIVIs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As disclosed in this paper, implementations allow editors to create professional productions using themes and based on a wide variety of amateur and professional content gathered from numerous sources. Although the foregoing implementations have been described in some detail for purposes of clarity of understanding, implementations are not necessarily limited to the details provided.

What is claimed is:

1. A system comprising:
   one or more processors;
   memory configured to instruct the one or more processors to implement:
   a network service request receiving engine, at a local network access device, configured to receive from a user device a request for a network service;
   a network service query formulation engine coupled to the network service request receiving engine and configured to formulate a query for the network service, the formulating being in response to the request for the network service;
   a network service query transfer engine coupled to the network service query formulation engine and configured to provide an instruction to a remote network access device to interrogate remote network service provider devices coupled to the remote network access device for capabilities in providing the network service;
   a network service query response engine, at the local network access device, coupled to the network service query transfer engine and configured to receive from at least one of the remote network service provider devices capable of providing the network service, access parameters related to the network service in response to the interrogation, the access parameters capable of being used to configure the user device to access the network service;

a user device configuration engine coupled to the network service query response engine and configured to configure the user device to access the network service from the at least one of the remote network service provider devices capable of providing the network service based on the access parameters without maintaining, at the local network access device, a state of the user device in accessing the network service as the user device accesses the network service and a state of the at least one of the remote network service provider devices in providing the network service to the user device.

2. The system of claim 1, wherein the network service query transfer engine is operative to instruct the remote network access device to interrogate the remote network service provider devices after the network service query formulation engine formulates the query for the network service.

3. The system of claim 1, wherein the user device configuration engine is operative to initiate transfer of the network service to the user device.

4. The system of claim 1, wherein the network service comprises one or more of: a print service, a file service, a sharing service, a peripheral or device-related service, a display control service, and a service that supports a particular communication protocol.

5. The system of claim 1, further comprising a user device tagging engine coupled to the network service request receiving engine and to the network service query formulation engine, the user device tagging engine configured to tag the request with a network location of the user device.

6. The system of claim 1, wherein the user device and the system reside on a first Virtual Local Area Network (VLAN), and the network service and the remote network access device reside on a second VLAN.

7. The system of claim 1, wherein the user device and the system reside in a first building, and the network service and the remote network access device reside in a second building.

8. The system of claim 1, wherein the system is incorporated into a network access device configured to control access to wireless network traffic.

9. The system of claim 8, wherein the network access device comprises one or more of a switch and a router.

10. A method comprising:
receiving at a local network access device, from a user device, a request for a network service;
formulating a query for the network service, the formulating being in response to the request;
providing an instruction to a remote network access device to interrogate remote network service provider devices coupled to the remote network access device for capabilities in providing the network service;
receiving, at the local network access device from at least one of the remote network service provider devices capable of providing the network service, access parameters related to the network service in response to the interrogation, the access parameters capable of being used to configure the user device to access the network service;
configuring the user device to access the network service from the at least one of the remote network service provider devices capable of providing the network service based on the access parameters without maintaining, at the local network access device, a state of the user device in accessing the network service as the user device accesses the network service and a state of the at least one of the remote network service provider devices in providing the network service to the user device.

11. The method of claim 10, wherein instructing the remote network access device to interrogate the remote network service provider devices occurs after formulating the query for the network service.

12. The method of claim 10, further comprising initiating transfer of the network service to the user device.

13. The method of claim 10, wherein the network service comprises one or more of: a print service, a file service, a sharing service, a peripheral or device-related service, a display control service, and a service that supports a particular communication protocol.

14. The method of claim 10, further comprising tagging the request with a network location of the user device.

15. The method of claim 10, wherein the user device resides on a first Virtual Local Area Network (VLAN), and the network service and the remote network access device reside on a second VLAN, the method executed in a system residing on the first VLAN.

16. The method of claim 10, wherein the user device resides in a first building, and the network service and the remote network access device reside in a second building, the method executed in a system residing in the first building.

17. The method of claim 10, wherein the method is executed on one or more of a router configured to control access to wireless network traffic, and a switch configured to control access to wireless network traffic.

18. A system comprising:
means for receiving at a local network access device, from a user device, a request for a network service;
means for formulating a query for the network service, the formulating being in response to the request;
means for providing an instruction to a remote network access device to interrogate remote network service provider devices coupled to the remote network access device for capabilities in providing the network service;
means for receiving, at the local network access device from at least one of the remote network service provider devices capable of providing the network service, access parameters related to the network service in response to the interrogation, the access parameters capable of being used to configure the user device to access the network service;
means for configuring the user device to access the network service from the at least one of the remote network service provider devices capable of providing the network service based on the access parameters without maintaining, at the local network access device, a state of the user device in accessing the network service as the user device accesses the network service and a state of the at least one of the remote network service provider devices in providing the network service to the user device.

* * * * *